US012088523B2

(12) United States Patent
Chen et al.

(10) Patent No.: US 12,088,523 B2
(45) Date of Patent: Sep. 10, 2024

(54) INFORMATION PROCESSING METHOD, COMMUNICATIONS DEVICE, SYSTEM, AND STORAGE MEDIUM

(71) Applicant: HUAWEI TECHNOLOGIES CO., LTD., Guangdong (CN)

(72) Inventors: Lei Chen, Beijing (CN); Bingzhao Li, Beijing (CN); Li Chai, Shenzhen (CN); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 521 days.

(21) Appl. No.: 17/214,201

(22) Filed: Mar. 26, 2021

(65) Prior Publication Data

US 2021/0218516 A1    Jul. 15, 2021

Related U.S. Application Data

(63) Continuation of application No. PCT/CN2019/107323, filed on Sep. 23, 2019.

(30) Foreign Application Priority Data

Sep. 27, 2018 (CN) .......................... 201811133698.9

(51) Int. Cl.
*H04L 5/00* (2006.01)
*H04B 17/27* (2015.01)
(Continued)

(52) U.S. Cl.
CPC ............. *H04L 5/005* (2013.01); *H04B 17/27* (2015.01); *H04B 17/382* (2015.01); *H04W 72/21* (2023.01); *H04W 76/11* (2018.02)

(58) Field of Classification Search
CPC ................ H04L 5/0082; H04L 5/0096; H04L 5/0051; H04L 5/005; H04W 76/11; H04B 17/382; H04B 17/27
See application file for complete search history.

(56) References Cited

U.S. PATENT DOCUMENTS 9,433,004 B2    8/2016    Siomina et al.
2011/0176499 A1    7/2011    Siomina et al.
(Continued)

FOREIGN PATENT DOCUMENTS

CN    103024757 A    4/2013
CN    103370633 A    10/2013
(Continued)

OTHER PUBLICATIONS

Office Action issued in Korean Application No. 2021-7012182 on Jul. 4, 2022, 19 pages (with English translation).
(Continued)

*Primary Examiner* — Iqbal Zaidi
(74) *Attorney, Agent, or Firm* — Fish & Richardson P.C.

(57) ABSTRACT

The present disclosure relates to information processing methods, communications devices, systems, and storage medium. One example method includes generating, by a network device, first configuration information of an uplink reference signal, where the first configuration information includes a first mapping relationship between an uplink reference signal resource and first information, the first information is number information or index information about a downlink reference signal of a location measurement unit (LMU), and the LMU is different from the network device, and sending, by the network device, the first configuration information to a terminal.

16 Claims, 15 Drawing Sheets

(51) Int. Cl.
*H04B 17/382* (2015.01)
*H04W 72/21* (2023.01)
*H04W 76/11* (2018.01)

(56) References Cited

U.S. PATENT DOCUMENTS

| | | | |
|---|---|---|---|
| 2015/0215793 | A1 | 7/2015 | Siomina et al. |
| 2017/0288897 | A1 | 10/2017 | You et al. |
| 2017/0366244 | A1 | 12/2017 | Lee et al. |
| 2018/0063810 | A1 | 3/2018 | Li et al. |
| 2018/0167895 | A1* | 6/2018 | Lee .................. H04W 64/003 |
| 2019/0215781 | A1* | 7/2019 | Jeon .................. H04W 52/325 |
| 2019/0387439 | A1* | 12/2019 | Huang ................. H04W 24/10 |

FOREIGN PATENT DOCUMENTS

| | | |
|---|---|---|
| CN | 104335631 A | 2/2015 |
| CN | 105850055 A | 8/2016 |
| CN | 107852582 A | 3/2018 |
| CN | 108064056 A | 5/2018 |
| CN | 108064081 A | 5/2018 |
| CN | 108076478 A | 5/2018 |
| CN | 108540995 A | 9/2018 |
| CN | 108702726 A | 10/2018 |
| JP | 2016502651 A | 1/2016 |
| JP | 2017525305 A | 8/2017 |
| WO | 2015096074 A1 | 7/2015 |
| WO | 2017223301 A1 | 12/2017 |

OTHER PUBLICATIONS

Office Action issued in Japanese Application No. 2021-517433 on Jul. 4, 2022, 6 pages (with English translation).

3GPP TS 36.331 V15.2.2 (Jun. 2018), "3rd Generation Partnership Project; Technical Specification Group Radio Access Network; Evolved Universal Terrestrial Radio Access (E-UTRA); Radio Resource Control (RRC); Protocol specification (Release 15)," Jun. 2018, 791 pages.

3GPP TS 38.214 V15.2.0 (Jun. 2018), "3rd Generation Partnership Project; Technical Specification Group Radio Access Network; NR; Physical layer procedures for data (Release 15)," Jun. 2018, 95 pages.

3GPP TS 38.305 V15.1.0 (Sep. 2018), "3rd Generation Partnership Project; Technical Specification Group Radio Access Network; NG Radio Access Network (NG-RAN); Stage 2 functional specification of User Equipment (UE) positioning in NG-RAN (Release 15)," Sep. 2018, 63 pages.

3GPP TS 38.331 V15.3.0 (Sep. 2018), "3rd Generation Partnership Project; Technical Specification Group Radio Access Network; NR; Radio Resource Control (RRC) protocol specification(Release 15)," Sep. 2018, 445 pages.

Catt, "UL Reference Signals for NR Positioning," 3GPP TSG RAN WG1 Meeting #97, R1-1906306, Reno, USA, May 13-17, 2019, 7 pages.

Intel Corporation, Ericsson, "New SID: Study on NR positioning support," 3GPP TSG RAN Meeting #80, RP-181399, La Jolla, USA, Jun. 11-14, 2018, 6 pages.

Office Action issued in Chinese Application No. 201811133698.9 on Aug. 27, 2020, 7 pages.

PCT International Search Report and Written Opinion issued in International Application No. PCT/CN2019/107323 on Dec. 19, 2019, 17 pages.

3GPP TS 38.455 V15.0.0 (Jun. 2018), "3rd Generation Partnership Project; Technical Specification Group Radio Access Network;NG-RAN;NR Positioning Protocol A (NRPPa) (Release 15)," Jun. 2018, 60 pages.

3GPP TS 38.133 V15.2.0 (Jun. 2018), "3rd Generation Partnership Project; Technical Specification Group Radio Access Network;NR-;Requirements for support of radio resource management(Release 15)," Jun. 2018, 79 pages.

3GPP TS 36.305 V14.0.0, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14)," Dec. 2016, 75 pages.

Office Action in Korean Appln. No. 10-2021-7012182, dated Mar. 4, 2023, 8 pages (with English translation).

Extended European Search Report issued in European Application No. 19866576.2 on Nov. 12, 2021, 8 pages.

* cited by examiner

INFORMATION PROCESSING METHOD, COMMUNICATIONS DEVICE, SYSTEM, AND STORAGE MEDIUM

CROSS-REFERENCE TO RELATED APPLICATIONS

This application is a continuation of International Application No. PCT/CN2019/107323, filed on Sep. 23, 2019, which claims priority to claims priority to Chinese Patent Application No. 201811133698.9, filed on Sep. 27, 2018. The disclosures of the aforementioned applications are hereby incorporated by reference in their entireties.

TECHNICAL FIELD

This application relates to the field of communications technologies, and in particular, to an information processing method, a communications device, a system, and a storage medium.

BACKGROUND

A base station positions a terminal generally by using an uplink time difference of arrival (Observed Time Difference Of Arrival, UTDOA) positioning method. In the method, a plurality of location measurement units (Location Measurement Unit. LMU) measure arrival moments of positioning signals sent by the terminal, and send the arrival moments to a positioning entity. In this way, the positioning entity positions the terminal based on a time difference of the arrival moments.

Currently, positioning a terminal by using a UTDOA method is generally used in a long term evolution (Long Term Evolution, LTE) technology. However, in LTE, the terminal omnidirectionally sends positioning signals. In other words, all LMUs near a location of the terminal can receive the positioning signals sent by the terminal. In other words, the LMUs that receive the positioning signals may send, to a positioning entity, receiving moments at which the positioning signals are received, and the positioning entity determines a time difference of arrival of the positioning signals based on the receiving moments reported by the LMUs, and positions the terminal based on the time difference of arrival.

However, a new radio access technology (New RAT (Radio Access Technology). NR) is used in working in a relatively high spectrum, to resist fading, a signal of an NR base station is transmitted through beamforming, and each beam corresponds to one direction. Consequently, some LMUs cannot receive positioning signals sent by a terminal, and in this case, a positioning entity cannot complete positioning of the terminal based on a time difference of arrival of the positioning signals.

SUMMARY

This application provides an information processing method, a communications device, a system, and a storage medium, to implement terminal positioning in an NR system.

According to a first aspect, this application provides a communication method. The method includes: generating, by a network device, first configuration information of an uplink reference signal, where the first configuration information includes a first mapping relationship between an uplink reference signal resource and first information, the first information is information about a downlink reference signal of a location measurement unit LMU, and the LMU is an LMU other than a serving base station; and sending, by the network device, the first configuration information to a terminal. According to the solution provided in this embodiment, the terminal can send a positioning signal on the configured uplink reference signal resource as indicated by the first configuration information, so that the LMU corresponding to the first information corresponding to the uplink reference signal resource can receive the positioning signal, thereby implementing UTDOA positioning in an NR system.

In a possible design, the method further includes: sending, by the network device, second configuration information to a positioning entity, where the second configuration information includes a second mapping relationship between the uplink reference signal resource and the LMU. According to the solution provided in this embodiment, it is possible for the positioning entity to freely select a target LMU. The positioning entity can select an LMU that better meets a positioning requirement of the positioning entity as the target LMU. This helps improve positioning accuracy.

In a possible design, the first information is number information or index information of the downlink reference signal of the LMU measured by the terminal. On one hand, the LMUs measured by the terminal ensure that the terminal can send positioning signals to the LMUs, and the LMUs can also receive the positioning signals sent by the terminal, thereby fundamentally ensuring a basis of positioning measurement. On the other hand, the first information is the number information or the index information of the downlink reference signals of the LMUs. This can uniquely identify a beam direction, and the number information or the index information has a relatively small amount of information. This facilitates establishment of the first mapping relationship and data transmission.

In a possible design, the method further includes: receiving, by the network device, positioning request information that is sent by the positioning entity and that is for the terminal. To be specific, the network device starts to perform the foregoing solution only after receiving the positioning request information sent by the positioning entity, thereby reducing system resources.

In a possible design, the positioning request information carries identification information of the LMU. In this case, the method further includes: sending, by the network device, first measurement information to the terminal, where the first measurement information is used to indicate the terminal to perform LMU measurement based on the identification information of the LMU, to obtain the first information; and receiving, by the network device, the first information sent by the terminal. According to the solution provided in this embodiment, a range in which the terminal performs LMU measurement is limited, and the terminal only needs to perform measurement in candidate LMUs indicated by the positioning entity. Compared with an LMU measurement manner without a range limitation, this reduces a workload of LMU measurement performed by the terminal, and helps improve processing efficiency.

In a possible design, the identification information of the LMU includes at least one of the following: a physical cell identifier PCI, a cell global identifier ECGI; a frequency; whether an uplink supplementary band SUL is supported; and a sequence number of the downlink reference signal.

In a possible design, the method further includes: sending, by the network device, second measurement information to the terminal, where the second measurement information is used to indicate the terminal to perform LMU measurement on all LMUs that can be measured by the terminal, to obtain the first information, in other words, indicate the terminal to perform measurement on frequencies on which downlink reference signals of all potential LMUs are located, to obtain the first information; and receiving, by the network device, the first information sent by the terminal. According to the solution provided in this embodiment, for the terminal, a case in which an LMU that can be used for positioning cannot be measured during measurement within a preset range is avoided, and the terminal can obtain, by performing LMU measurement only once, all the LMUs that can be measured by the terminal. In addition, this manner helps increase a quantity of LMUs corresponding to the first information, and a larger quantity of LMUs used for positioning helps improve positioning accuracy.

In a possible design, the method further includes: detecting, by the network device, whether the first information reported by the terminal exists in historical measurement information, where the historical measurement information is measurement information that is previously measured by the terminal and that is sent to the network device: and if the first information reported by the terminal exists in the historical measurement information, obtaining, by the network device, the first information that is reported by the terminal and that is recorded in the historical measurement information: or if the first information reported by the terminal does not exist in the historical measurement information, indicating, by the network device, the terminal to perform LMU measurement to obtain the first information. According to the solution provided in this embodiment, the network device does not need to request the terminal to perform LMU measurement before generating the first configuration information, thereby simplifying processing steps before the first configuration information is generated, helping improve processing efficiency, and reducing system resources.

In a possible design, the LMU is a part of all the LMUs measured by the terminal, and signal strength of the LMU is greater than or equal to a preset signal strength threshold. According to the solution provided in this embodiment, the terminal filters the measured LMUs based on signal strength, and uses only some LMUs with relatively high signal strength as LMUs that can be used for positioning measurement, to avoid a case in which a receiving moment is affected due to signal strength in a positioning measurement process.

In a possible design, the method further includes: determining, by the network device, whether a quantity of LMUs is greater than or equal to a minimum quantity of LMUs required for positioning measurement; and sending, by the network device, a notification message to the positioning entity if the quantity of LMUs is less than the minimum quantity, where the notification message is used to notify the positioning entity that a current location of the terminal does not meet a positioning condition. According to the solution provided in this embodiment, it can be ensured that the first configuration information that is configured by the network device and that is sent to the terminal can meet a minimum requirement of UTDOA positioning measurement, thereby avoiding a case in which positioning cannot be performed because there are not sufficient LMUs and thus there are not sufficient receiving moments when the positioning entity positions the terminal.

In a possible design, the second configuration information further includes the first mapping relationship. In this case, the positioning entity may further determine a beam direction corresponding to each uplink reference signal resource, so that a case in which a positioning signal is incorrectly received at the target LMU can be avoided to some extent.

In a possible design, the first configuration information further includes the second mapping relationship between the uplink reference signal resource and the LMU. In this case, the terminal may determine, based on the first configuration information, a receiver and a beam direction of the positioning signal sent by the terminal. This is more targeted, and a signal transmission error can be avoided to some extent.

According to a second aspect, this application provides an information processing method. The method includes: sending, by a positioning entity, positioning request information for a terminal to a network device; receiving, by the positioning entity, second configuration information, where the second configuration information includes a second mapping relationship between an uplink reference signal resource and a location measurement unit LMU, and the uplink reference signal resource is configured by the network device for the terminal; determining, by the positioning entity, a target LMU in candidate LMUs based on the second configuration information; sending, by the positioning entity, measurement configuration information to the target LMU, where the measurement configuration information carries the uplink reference signal resource; receiving, by the positioning entity, a receiving moment that is of an uplink reference signal and that is measured by the target LMU on the uplink reference signal resource; and positioning, by the positioning entity, the terminal based on the receiving moment. According to the solution provided in this embodiment, the positioning entity may freely select the target LMU, that is, can select an LMU that better meets a positioning requirement of the positioning entity as the target LMU.

In a possible design, the sending, by a positioning entity, positioning request information for a terminal to a network device includes: determining, by the positioning entity based on a geographic location of the terminal, the candidate LMUs for performing positioning measurement on the terminal; and sending, by the positioning entity, the positioning request information to the network device, where the positioning request information carries identification information of the LMU. According to the solution provided in this embodiment, the network device may specify some LMUs as the candidate LMUs in advance, thereby helping subsequently narrow down a measurement range when the network device indicates the terminal to perform LMU measurement and improving processing efficiency.

In a possible design, the identification information of the candidate LMU includes at least one of the following: a physical cell identifier PCI; a cell global identifier ECGI; a frequency; and whether an uplink supplementary band SUL is supported.

In a possible design, the second configuration information further includes a first mapping relationship between the uplink reference signal resource and first information, the first information is information about a downlink reference signal of the location measurement unit LMU, and the LMU is an LMU other than a serving base station. According to the solution provided in this embodiment, the positioning entity may further determine a beam direction corresponding to each uplink reference signal resource, so that a case in which a positioning signal is incorrectly received at the target LMU can be avoided to some extent.

In a possible design, the first information is number information or index information of the downlink reference signal of the LMU. On one hand, the LMUs measured by the terminal ensure that the terminal can send positioning signals to the LMUs, and the LMUs can also receive the positioning signals sent by the terminal, thereby fundamentally ensuring a basis of positioning measurement. On the other hand, the first information is the number information or the index information of the downlink reference signals of the LMUs. This can uniquely identify a beam direction, and the number information or the index information has a relatively small amount of information. This facilitates establishment of the first mapping relationship and data transmission.

According to a third aspect, this application provides an information processing method. The method includes: receiving, by a terminal, first configuration information sent by a network device, where the first configuration information includes at least a first mapping relationship between an uplink reference signal resource and first information, the first information is information about a downlink reference signal of a location measurement unit LMU, and the LMU is an LMU other than a serving base station: and sending, by the terminal, an uplink reference signal based on the first configuration information. According to the solution provided in this embodiment, the terminal can send a positioning signal on the configured uplink reference signal resource, so that the LMU corresponding to the first information corresponding to the uplink reference signal resource can receive the positioning signal, thereby implementing UTDOA positioning in an NR system.

In a possible design, the first configuration information further includes a second mapping relationship between the uplink reference signal resource and the LMU. In this case, the terminal may determine, based on the first configuration information, a receiver and a beam direction of the positioning signal sent by the terminal. This is more targeted, and a signal transmission error can be avoided to some extent.

According to a fourth aspect, this application provides an information processing method, including: receiving, by a location measurement unit LMU, measurement configuration information sent by a positioning entity, where the measurement configuration information carries an uplink reference signal resource; receiving, by the LMU, an uplink reference signal based on the uplink reference signal resource, and recording a receiving moment; and sending, by the LMU, the receiving moment to the positioning entity. According to the solution provided in this embodiment, the target LMU can receive, on the uplink reference signal resource indicated by the positioning entity, a positioning signal sent by a terminal, and send a receiving moment of each positioning signal to the positioning entity, to implement UTDOA positioning in an NR system.

In a possible design, the LMU is integrated into a network device. In this setting manner, costs of separately setting the LMU can be reduced.

According to a fifth aspect, this application provides a communications device. The communications device includes, a generation module, configured to generate first configuration information of an uplink reference signal, where the first configuration information includes a first mapping relationship between an uplink reference signal resource and first information, the first information is information about a downlink reference signal of a location measurement unit LMU, and the LMU is an LMU other than a serving base station; and a sending module, configured to send the first configuration information to a terminal. According to the solution provided in this embodiment, the terminal can send a positioning signal on the configured uplink reference signal resource as indicated by the first configuration information, so that the LMU corresponding to the first information corresponding to the uplink reference signal resource can receive the positioning signal, thereby implementing UTDOA positioning in an NR system.

In a possible design, the sending module is further configured to: send second configuration information to a positioning entity, where the second configuration information includes a second mapping relationship between the uplink reference signal resource and the LMU. According to the solution provided in this embodiment, it is possible for the positioning entity to freely select a target LMU. The positioning entity can select an LMU that better meets a positioning requirement of the positioning entity as the target LMU. This helps improve positioning accuracy.

In a possible design, the first information is number information or index information of the downlink reference signal of the LMU measured by the terminal. On one hand, the LMUs measured by the terminal ensure that the terminal can send positioning signals to the LMUs, and the LMUs can also receive the positioning signals sent by the terminal, thereby fundamentally ensuring a basis of positioning measurement. On the other hand, the first information is the number information or the index information of the downlink reference signals of the LMUs. This can uniquely identify a beam direction, and the number information or the index information has a relatively small amount of information. This facilitates establishment of the first mapping relationship and data transmission.

In a possible design, the communications device further includes: a receiving module, configured to receive positioning request information that is sent by the positioning entity and that is for the terminal. To be specific, the network device starts to perform the foregoing solution only after receiving the positioning request information sent by the positioning entity, thereby reducing system resources.

In a possible design, the positioning request information carries identification information of the LMU. In this case, the sending module is further configured to send first measurement information to the terminal, where the first measurement information is used to indicate the terminal to perform LMU measurement based on the identification information of the LMU, to obtain the first information; and the receiving module is further configured to receive the first information sent by the terminal. According to the solution provided in this embodiment, a range in which the terminal performs LMU measurement is limited, and the terminal only needs to perform measurement in candidate LMUs indicated by the positioning entity. Compared with an LMU measurement manner without a range limitation, this reduces a workload of LMU measurement performed by the terminal, and helps improve processing efficiency.

In a possible design, the identification information of the LMU includes at least one of the following: a physical cell identifier PCI; a cell global identifier ECGI; a frequency; and whether an uplink supplementary band SUL is supported.

In a possible design, the sending module is further configured to send second measurement information to the terminal, where the second measurement information is used to indicate the terminal to perform LMU measurement on all LMUs that can be measured by the terminal, to obtain the first information: and the receiving module is further configured to receive the first information sent by the terminal. According to the solution provided in this embodiment, for the terminal, a case in which an LMU that can be used for positioning cannot be measured during measurement within a preset range is avoided, and the terminal can obtain, by performing LMU measurement only once, all the LMUs that can be measured by the terminal. In addition, this manner helps increase a quantity of LMUs corresponding to the first information, and a larger quantity of LMUs used for positioning helps improve positioning accuracy.

In a possible design, the network device may further include a processing module, configured to: detect whether the first information reported by the terminal exists in historical measurement information, where the historical measurement information is measurement information that is previously measured by the terminal and that is sent to the network device; and if the first information reported by the terminal exists in the historical measurement information, obtain the first information that is reported by the terminal and that is recorded in the historical measurement information; or if the first information reported by the terminal does not exist in the historical measurement information, indicate the terminal to perform LMU measurement to obtain the first information. According to the solution provided in this embodiment, the network device does not need to request the terminal to perform LMU measurement before generating the first configuration information, thereby simplifying processing steps before the first configuration information is generated, helping improve processing efficiency, and reducing system resources.

In a possible design, the LMU is a part of all the LMUs measured by the terminal, and signal strength of the LMU is greater than or equal to a preset signal strength threshold. According to the solution provided in this embodiment, the terminal filters the measured LMUs based on signal strength, and uses only some LMUs with relatively high signal strength as LMUs that can be used for positioning measurement, to avoid a case in which a receiving moment is affected due to signal strength in a positioning measurement process.

In a possible design, the processing module of the network device is further configured to: determine whether a quantity of LMUs is greater than or equal to a minimum quantity of LMUs required for positioning measurement; and send a notification message to the positioning entity if the quantity of LMUs is less than the minimum quantity, where the notification message is used to notify the positioning entity that a current location of the terminal does not meet a positioning condition. According to the solution provided in this embodiment, it can be ensured that the first configuration information that is configured by the network device and that is sent to the terminal can meet a minimum requirement of UTDOA positioning measurement, thereby avoiding a case in which positioning cannot be performed because there are not sufficient LMUs and thus there are not sufficient receiving moments when the positioning entity positions the terminal.

According to a sixth aspect, this application provides a communications device. The communications device includes: a sending module, configured to send positioning request information for a terminal to a network device; a receiving module, configured to receive second configuration information, where the second configuration information includes a second mapping relationship between an uplink reference signal resource and candidate location measurement units LMUs, and the uplink reference signal resource is configured by the network device for the terminal; a determining module, configured to determine a target LMU in the candidate LMUs based on the second configuration information, where the sending module is further configured to send measurement configuration information to the target LMU, where the measurement configuration information carries the uplink reference signal resource; and the receiving module is further configured to receive a receiving moment that is of an uplink reference signal and that is measured by the target LMU on the uplink reference signal resource; and a positioning module, configured to position the terminal based on the receiving moment. According to the solution provided in this embodiment, the positioning entity may freely select the target LMU, that is, can select an LMU that better meets a positioning requirement of the positioning entity as the target LMU.

In a possible design, the sending module is specifically configured to: determine, based on a geographic location of the terminal, the candidate LMUs for performing positioning measurement on the terminal; and send the positioning request information to the network device, where the positioning request information carries identification information of the LMU.

According to the solution provided in this embodiment, the network device may specify some LMUs as the candidate LMUs in advance, thereby helping subsequently narrow down a measurement range when the network device indicates the terminal to perform LMU measurement and improving processing efficiency.

In a possible design, the identification information of the candidate LMU includes at least one of the following: a physical cell identifier PCI; a cell global identifier ECGI; a frequency; and whether an uplink supplementary band SUL is supported.

In a possible design, the second configuration information further includes a first mapping relationship between the uplink reference signal resource and first information, the first information is information about a downlink reference signal of the location measurement unit LMU, and the LMU is an LMU other than a serving base station. According to the solution provided in this embodiment, the positioning entity may further determine a beam direction corresponding to each uplink reference signal resource, so that a case in which a positioning signal is incorrectly received at the target LMU can be avoided to some extent.

In a possible design, the first information is number information or index information of the downlink reference signal of the LMU. On one hand, the LMUs measured by the terminal ensure that the terminal can send positioning signals to the LMUs, and the LMUs can also receive the positioning signals sent by the terminal, thereby fundamentally ensuring a basis of positioning measurement. On the other hand, the first information is the number information or the index information of the downlink reference signals of the LMUs. This can uniquely identify a beam direction, and the number information or the index information has a relatively small amount of information. This facilitates establishment of the first mapping relationship and data transmission.

According to a seventh aspect, this application provides a communications device. The communications device includes: a receiving module, configured to receive first configuration information sent by a network device, where the first configuration information includes at least a first mapping relationship between an uplink reference signal resource and first information, the first information is information about a downlink reference signal of a location measurement unit LMU, and the LMU is an LMU other than a serving base station; and a sending module, configured to send an uplink reference signal on the uplink reference signal resource indicated by the first information. According to the solution provided in this embodiment, the terminal can send a positioning signal on the configured uplink reference signal resource, so that the LMU corresponding to the first information corresponding to the uplink reference signal resource can receive the positioning signal, thereby implementing UTDOA positioning in an NR system.

According to an eighth aspect, this application provides a communications device. The communications device includes: a receiving module, configured to receive measurement configuration information sent by a positioning entity, where the measurement configuration information carries an uplink reference signal resource, where the receiving module is further configured to receive an uplink reference signal based on the uplink reference signal resource; a recording module, configured to record a receiving moment of the uplink reference signal; and a sending module, configured to send the receiving moment to the positioning entity. According to the solution provided in this embodiment, the target LMU can receive, on the uplink reference signal resource indicated by the positioning entity, a positioning signal sent by a terminal, and send a receiving moment of each positioning signal to the positioning entity, to implement UTDOA positioning in an NR system.

According to a ninth aspect, this application provides a communications device. The communications device includes a module, a component, or a circuit configured to implement the communication method according to any one of the first aspect to the fourth aspect.

According to a tenth aspect, this application provides a communications device. The communications device includes a transceiver, a processor, a memory, and a bus, where the transceiver, the processor, and the memory are separately connected to the bus, the memory stores a program instruction, and the processor runs the program instruction to perform the method according to the first aspect, the second aspect, the third aspect, or the fourth aspect.

In a possible design, the communications device according to the fifth aspect or the sixth aspect may be a network device, a positioning entity, a terminal, or an LMU, or may be a network device, a positioning entity, a terminal, or a component (for example, a chip or a circuit) in an LMU.

According to an eleventh aspect, this application provides a computer-readable storage medium. The computer-readable storage medium stores a computer program. When the computer program is run on a computer, the computer is enabled to perform the method according to the first aspect, the second aspect, the third aspect, or the fourth aspect.

According to a twelfth aspect, this application provides a computer program. When being executed by a computer, the computer program is used to perform the method according to the first aspect, the second aspect, the third aspect, or the fourth aspect.

In a possible design, all or some of the programs in the twelfth aspect may be stored in a storage medium encapsulated with a processor, or some or all of the programs may be stored in a memory that is not encapsulated with a processor.

According to a thirteenth aspect, an embodiment of this application further provides a communications system, including the communications device according to the fifth aspect, the sixth aspect, the seventh aspect, or the eighth aspect.

According to a fourteenth aspect, an embodiment of this application further provides a communications system, including the communications device according to the ninth aspect or the tenth aspect.

It can be learned that in the foregoing aspects, the terminal can send a positioning signal on the configured uplink reference signal resource as indicated by the first configuration information, so that the LMU corresponding to the first information corresponding to the uplink reference signal resource can receive the positioning signal, thereby implementing UTDOA positioning in an NR system.

DESCRIPTION OF EMBODIMENTS

Terms used in DESCRIPTION OF EMBODIMENTS of this application are only used to explain specific embodiments of this application, and are not intended to limit this application.

The embodiments of this application may be applied to a 5G NR system. In addition, this application may be further applied to any other communications system in which a transmission direction needs to be indicated. In these communications systems, there is an entity that is configured to send first information in a transmission direction, and there is another entity that can receive the first information, and determine a signal transmission direction within a specific time based on the first information.

Figure 1:
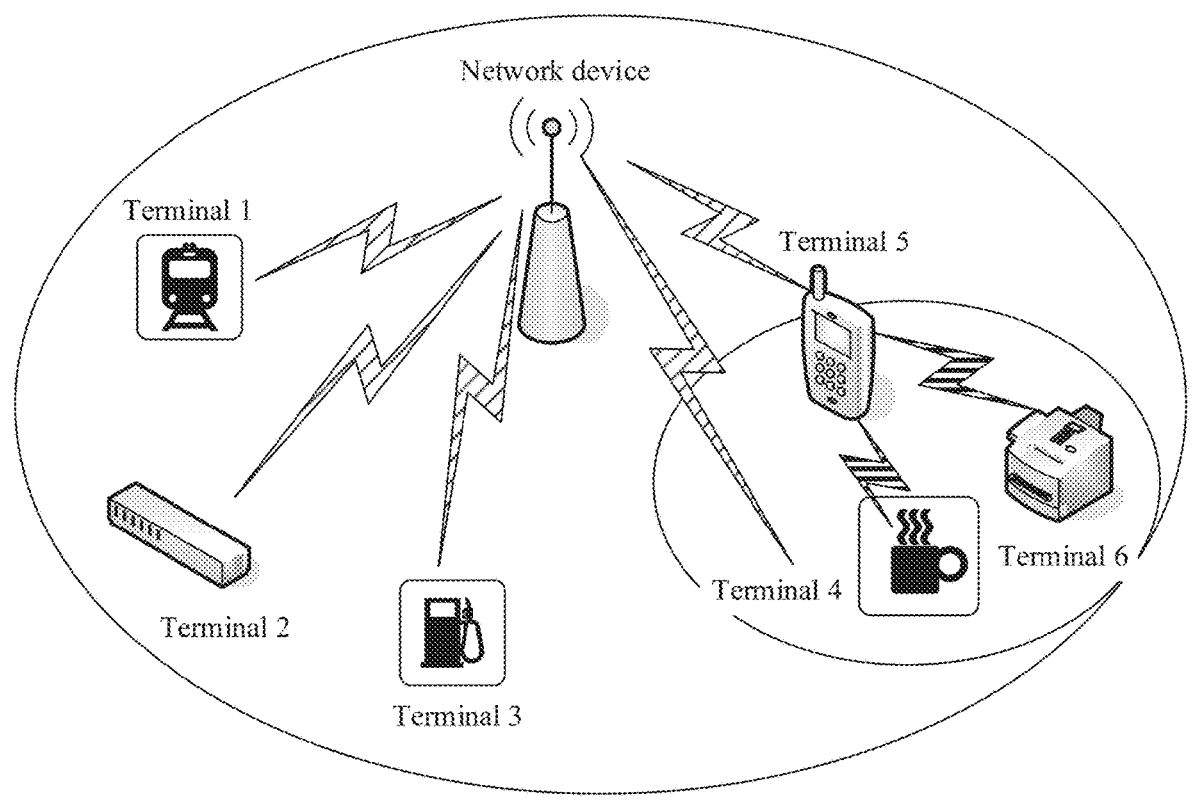
FIG. 1 is a schematic diagram of an application scenario according to an embodiment of this application.

FIG. 1 is a schematic diagram of an application scenario according to an embodiment of this application. A communications system includes a network device and a plurality of terminals. FIG. 1 shows six terminals (a terminal 1 to a terminal 6). In the communications system shown in FIG. 1, the terminal 1 to the terminal 6 may all send uplink data to the network device, and the network device may receive the uplink data sent by the terminal 1 to the terminal 6, and send downlink data to the terminal 1 to the terminal 6. In addition, as shown in FIG. 1, the terminal 4 to the terminal 6 may also form a communications system. In the communications system formed by the terminal 4 to the terminal 6, the network device may send downlink data to the terminal 5, and the terminal 5 may receive uplink data sent by the terminal 4 and the terminal 6, and send downlink data to the terminal 4 and the terminal 6.

The network device may be a network side device, for example, a wireless fidelity (Wireless-Fidelity. WiFi) access point AP, a next-generation communications base station such as a 5G NR base station, such as a 5G gNB, a small cell, or a micro cell, a transmission reception point (Transmission Reception Point, TRP), a relay station, an access point, a vehicle-mounted device, a wearable device, or the like. In this embodiment, communications systems of different communications standards have different base stations. For ease of differentiation, a base station in a 4G communications system is referred to as an LTE eNB, a base station in a 5G communications system is referred to as an NR gNB, and a base station that supports both a 4G communications system and a 5G communications system is referred to as an eLTE eNB. These names are merely for ease of differentiation, and do not have limitative meanings.

The terminal is also referred to as user equipment (User Equipment, UE), and is a device that provides a user with voice and/or data connectivity, for example, a handheld device or a vehicle-mounted device with a wireless connection function. Common terminals include, for example, a mobile phone, a tablet computer, a notebook computer, a palmtop computer, a mobile internet device (mobile internet device, MID), and a wearable device such as a smartwatch, a smart band, and a pedometer.

In addition, a positioning entity may be a positioning server. In this application, the positioning entity may include but is not limited to: an evolved serving mobile location center (Evolved Serving Mobile Location Center, E-SMLC) or a location management function (Location Management Function. LMF).

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

It should be noted that a quantity and types of terminals included in the communications system shown in FIG. 1 are merely examples, and the embodiments of this application are not limited thereto. For example, more terminals that communicate with the network device may be further included. For brevity, details are not described in the accompanying drawings. In addition, in the communications system shown in FIG. 1, although the network device and the terminal are shown, the communications system may include but is not limited to the network device and the terminal, for example, may further include a core network node or a device configured to bear a virtualized network function. This is obvious to a person skilled in the art, details are not described herein.

In addition, the embodiments of this application may be applied to not only a next-generation wireless communications system, namely, a 5G communications system, but also another communications system that may appear in the future and in which a transmission direction needs to be indicated, for example, a next-generation Wi-Fi network or a 5G internet of vehicles.

It should be noted that, with continuous evolution of the communications system, names of the foregoing network elements may change in another system that may appear in the future. In this case, the solutions provided in the embodiments of this application are also applicable.

For ease of description, a UTDOA technology is briefly described below.

A UTDOA positioning method is that an LMU side measures receiving moments of positioning signals sent by a terminal, and sends the receiving moments to a positioning entity, and the positioning entity positions the terminal based on a time difference of arrival between receiving moments sent by a plurality of (generally at least three) LMUs.

It should be noted that the LMU is a name of a function station that measures an uplink reference signal in LTE, and may have another name in an NR system or another system. For example, the LMU is referred to as a transmission measurement function network element (transmission measurement function, TMF), a transmission reception point (transmission reception point, TRP), and the like in the NR system. Other names of the LMU are not limited in this application, and any functional entity, network element, station, or device that has a function of measuring an uplink reference signal of a terminal device may be referred to as an LMU.

It may be understood that the uplink reference signal may have a plurality of functions, for example, functions such as channel measurement and positioning. In this embodiment, that the uplink reference signal is used for positioning is mainly used for description.

Figure 2:
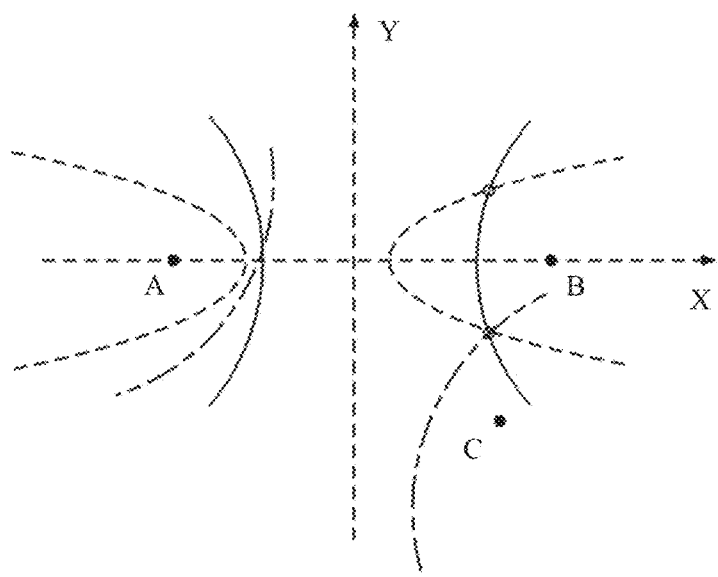
FIG. 2 is a schematic diagram of a principle of a UTDOA technology according to this application.

In addition, in some implementation scenarios, the LMU is disposed on a network device side. Therefore, it may also be considered that the network device measures a receiving moment of a positioning signal sent by the terminal, and sends the receiving moment to the positioning entity. In the implementation scenario, the LMU may be combined with a base transceiver station (Base Transceiver Station, BTS), or may be disposed separately. Using the implementation scenario as an example, because a geographical location of each BTS is known, a location of a mobile terminal can be calculated by using a spherical triangle. FIG. 2 shows a mathematical principle of the UTDOA technology in the scenario.

As shown in FIG. 2, it is assumed that coordinates of points A. B, and C are respectively $(x_1, y_1)$, $(x_2, y_2)$, and $(x_3, y_3)$. For any point (x, y), it is assumed that time points at which a signal is transmitted from the point to A, B, and C are respectively $t_1$, $t_2$, and $t_3$. Then, the following two hyperbolic equations may be established:

$$\sqrt[2]{(x_1-x)^2+(y_1-y)^2} - \sqrt[2]{(x_2-x)^2+(y_2-y)^2} = c(t_1-t_2)$$
$$\sqrt[2]{(x_3-x)^2+(y_3-y)^2} - \sqrt[2]{(x_1-x)^2+(y_1-y)^2} = c(t_3-t_1)$$

Therefore, only the two hyperbolic equations need to be solved, so that coordinates of any point (x, y) can be obtained, and any point can be positioned.

It can be learned that in UTDOA, a difference between transmission time at which positioning signals transmitted by the terminal arrive at different BTSs, rather than a pure transmission time, is measured. In addition, in an LTE system, the positioning signal may be a channel sounding reference signal (Sounding Reference Signal, SRS).

In addition, an LTE positioning protocol, namely, the lightweight presentation protocol (Lightweight Presentation Protocol, LPP), is further defined in a third generation partnership project long term evolution (Third Generation Partnership Project Long Term Evolution, 3GPP-LTE) system.

As a general positioning communication protocol, the LPP positioning protocol is mainly used to exchange positioning assistance data and positioning information between the network device and the terminal. The LPP positioning protocol can be actually used in both a control plane and a data plane. Relatively speaking, an implementation of the control plane involves a dedicated control channel and significantly increases costs of a mobile network, because a plurality of network elements need to be upgraded in software and hardware to support positioning-related control plane signaling. Therefore, the implementation of the user plane is easier to be used in commercial applications.

In addition, in some LTE communications systems, the LPP positioning protocol already supports a satellite-based positioning technology, an observed time difference of arrival (Observed Time Difference of Arrival, OTDOA)-based positioning technology, an enhanced cell ID (Enhanced Cell identity, E-CID)-based positioning technology, a UTDOA-based positioning technology, a Wi-Fi-based positioning technology, a sensor-based positioning technology, a Bluetooth-based positioning technology, a TBS-based positioning technology, and a hybrid positioning technology thereof.

Figure 3:
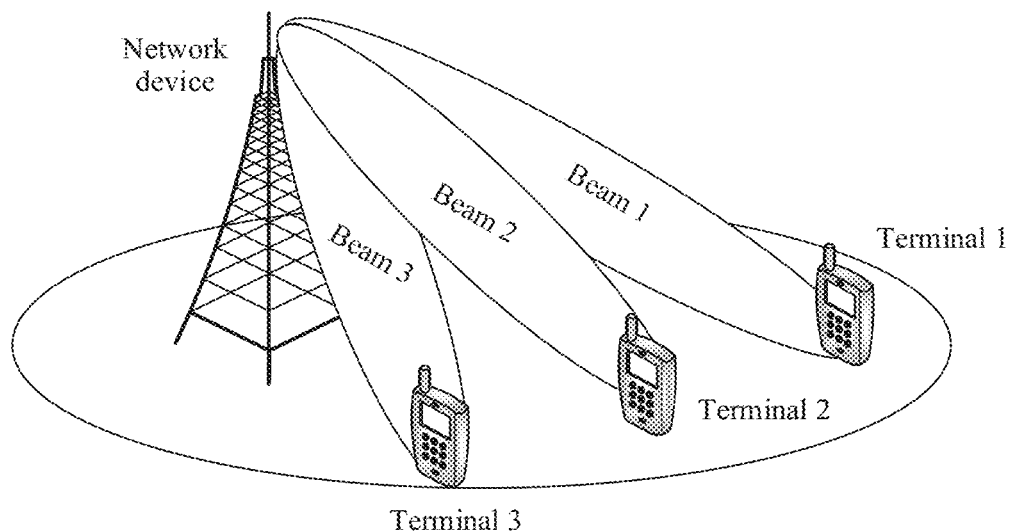
FIG. 3 is a schematic diagram of a downlink signal sending manner in an NR system according to this application.

In an NR system, a signal of a base station is transmitted through beamforming. A width and a reference sign of a beam vary with a type of a transmitted signal. For example, when the base station sends an SSB signal, there may be a maximum of 4, 8, or 64 beams based on different working frequencies of the base station, and each beam corresponds to one direction. FIG. 3 shows a signal transmission manner of a base station in an NR system. As shown in FIG. 3, a same NR base station transmits a signal to a terminal 1 based on a beam 1, transmits a signal to a terminal 2 based on a beam 2, and transmits a signal to a terminal 3 based on a beam 3. The beam 1, the beam 2, and the beam 3 respectively correspond to different directions.

Figure 4:
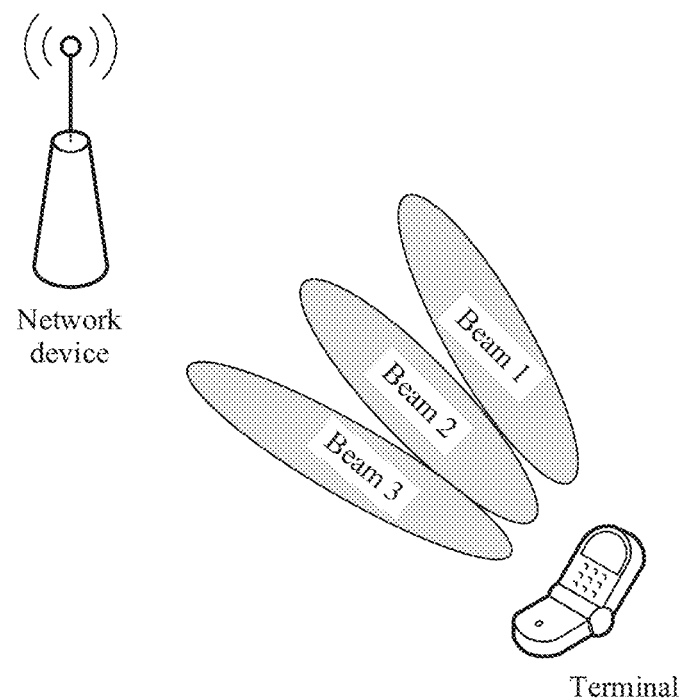
FIG. 4 is a schematic diagram of an uplink signal sending manner in an NR system according to this application.

Similarly, in the NR system, to improve transmission efficiency of an uplink signal, the uplink signal may also be sent in a form of a beam. As shown in FIG. 4, a terminal device sends an uplink signal to a network device in a beam manner.

Figure 5:
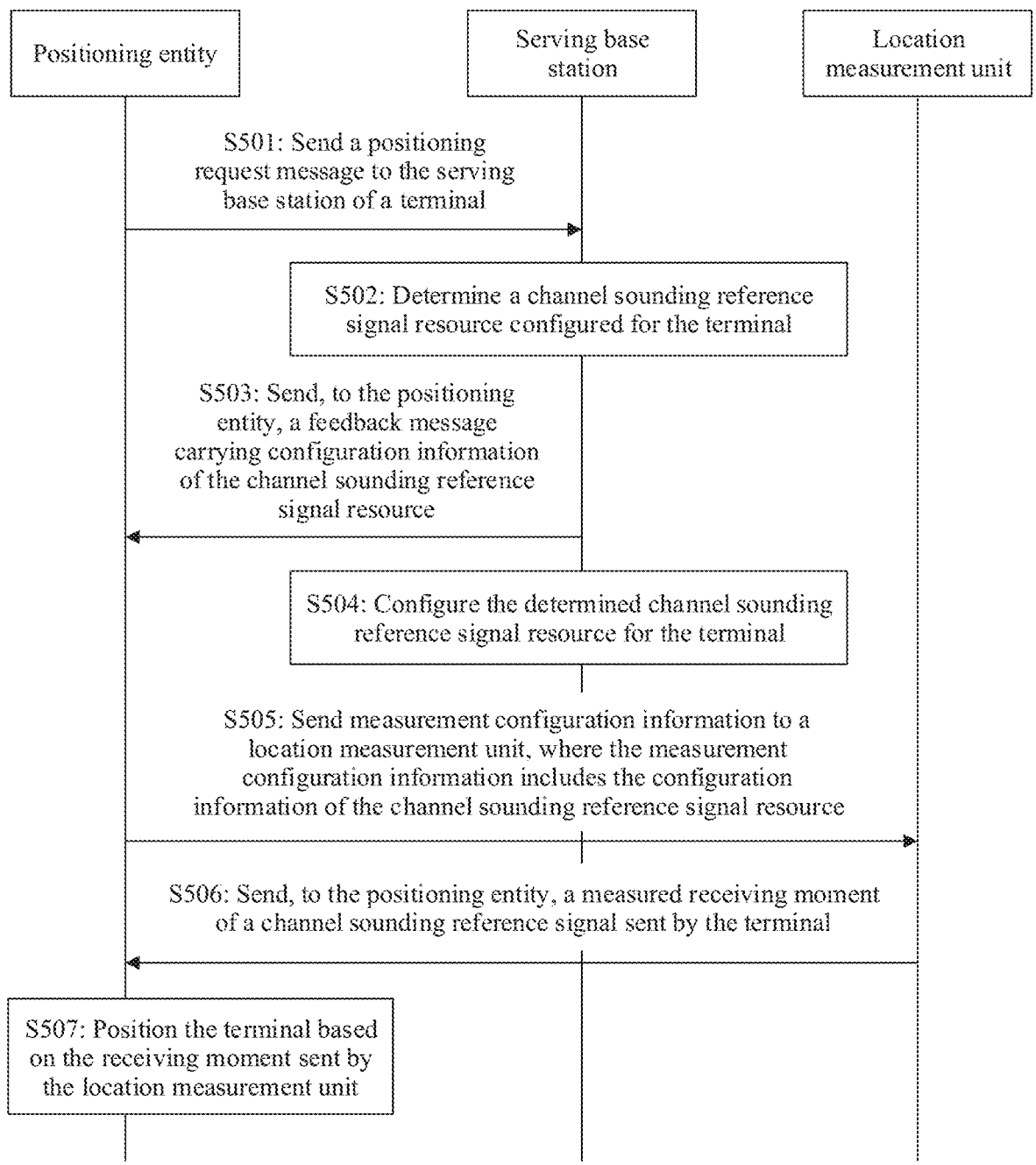
FIG. 5 is a schematic diagram of a UTDOA positioning technology in an LTE system according to this application.

In addition, FIG. 5 is a schematic diagram of a UTDOA positioning technology in an LTE system. As shown in FIG. 5, in the LTE system, the following steps are included.

S501: A positioning entity sends a positioning request message (Information Request) to a serving base station of a terminal.

S502: The serving base station determines a channel sounding reference signal (Sounding Reference Signal, SRS) resource configured for the terminal.

S503: The serving base station sends, to the positioning entity, a feedback message (Information Response) carrying configuration information of the SRS resource.

S504: The serving base station configures the determined SRS resource for the terminal.

S505: The positioning entity sends measurement configuration information to an LMU, where the measurement configuration information includes the configuration information of the SRS resource.

S506: The LMU sends, to the positioning entity, a measured receiving moment of an SRS signal sent by the terminal.

In this way, the terminal may send the SRS signal based on the SRS resource configured by the serving base station. Because a signal in the LTE system is omnidirectionally sent, an LMU near the terminal may receive the SRS signal sent by the terminal, and record the receiving moment. Therefore, each LMU sends the measured receiving moment to the positioning entity. For ease of description. FIG. 5 shows only one LMU.

S507: The positioning entity positions the terminal based on the receiving moment sent by the LMU.

It can be learned that a positioning procedure shown in FIG. 5 is not applicable to an NR system because a working spectrum in which the NR system works is relatively high. To resist fading, a signal in the NR system is sent in a form of a beam. Consequently, some LMUs cannot receive an SRS signal sent by UE, and cannot perform UTDOA positioning.

For the foregoing problem, the embodiments of this application provide a feasible solution idea: When UTDOA positioning is implemented in an NR system, a network device may first obtain beam information of an LMU near a terminal, to configure a corresponding uplink reference signal resource for the terminal, so that the terminal can send a positioning signal on the uplink reference signal resource configured by the network device. In this way, the LMU can also receive the positioning signal sent by the terminal.

This application provides an information processing method. The following describes the information processing method in detail with reference to the embodiments.

Figure 6A:
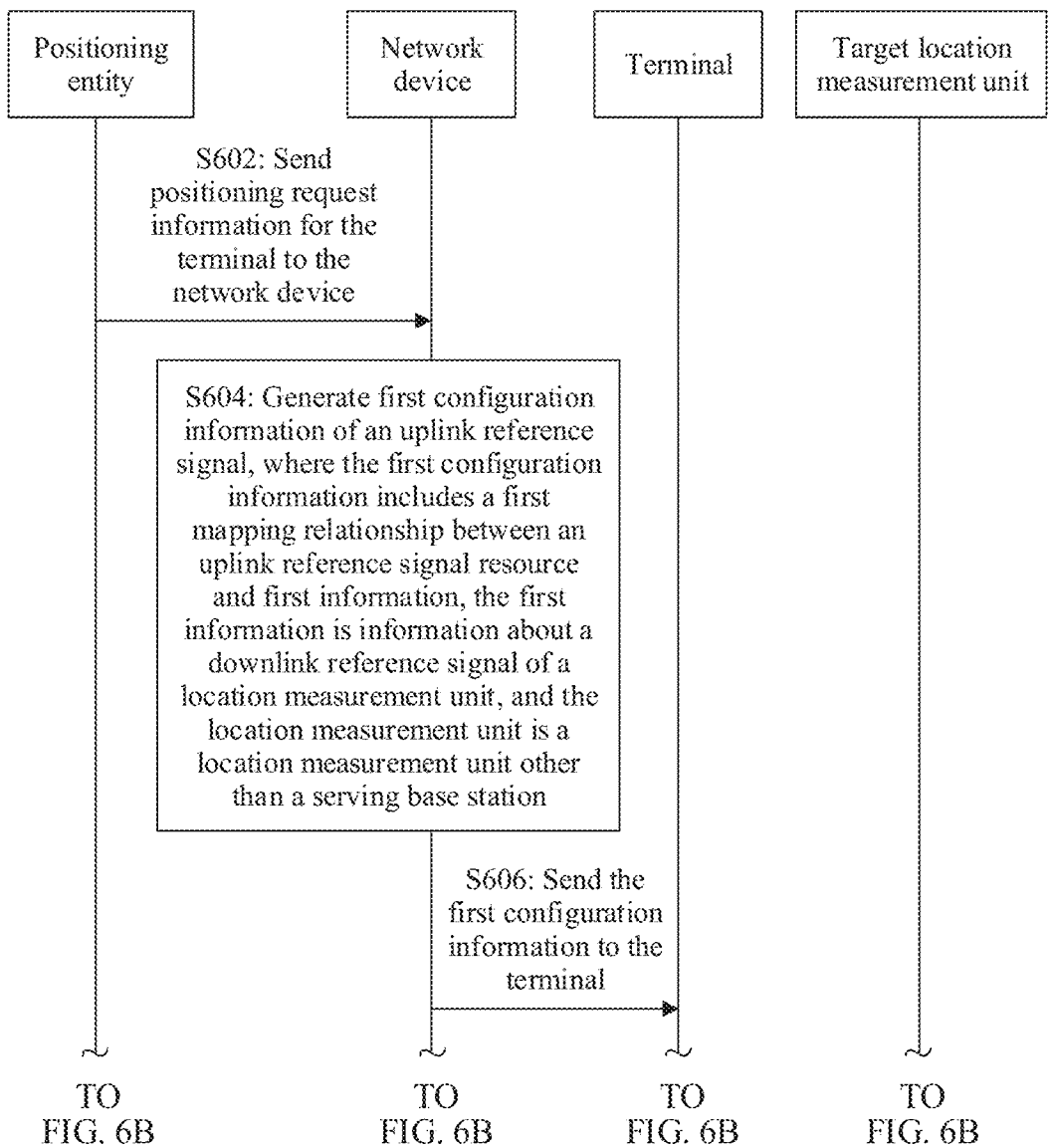
FIG. 6A and FIG. 6B are a schematic interaction flowchart of an information processing method according to this application.
Figure 6B:
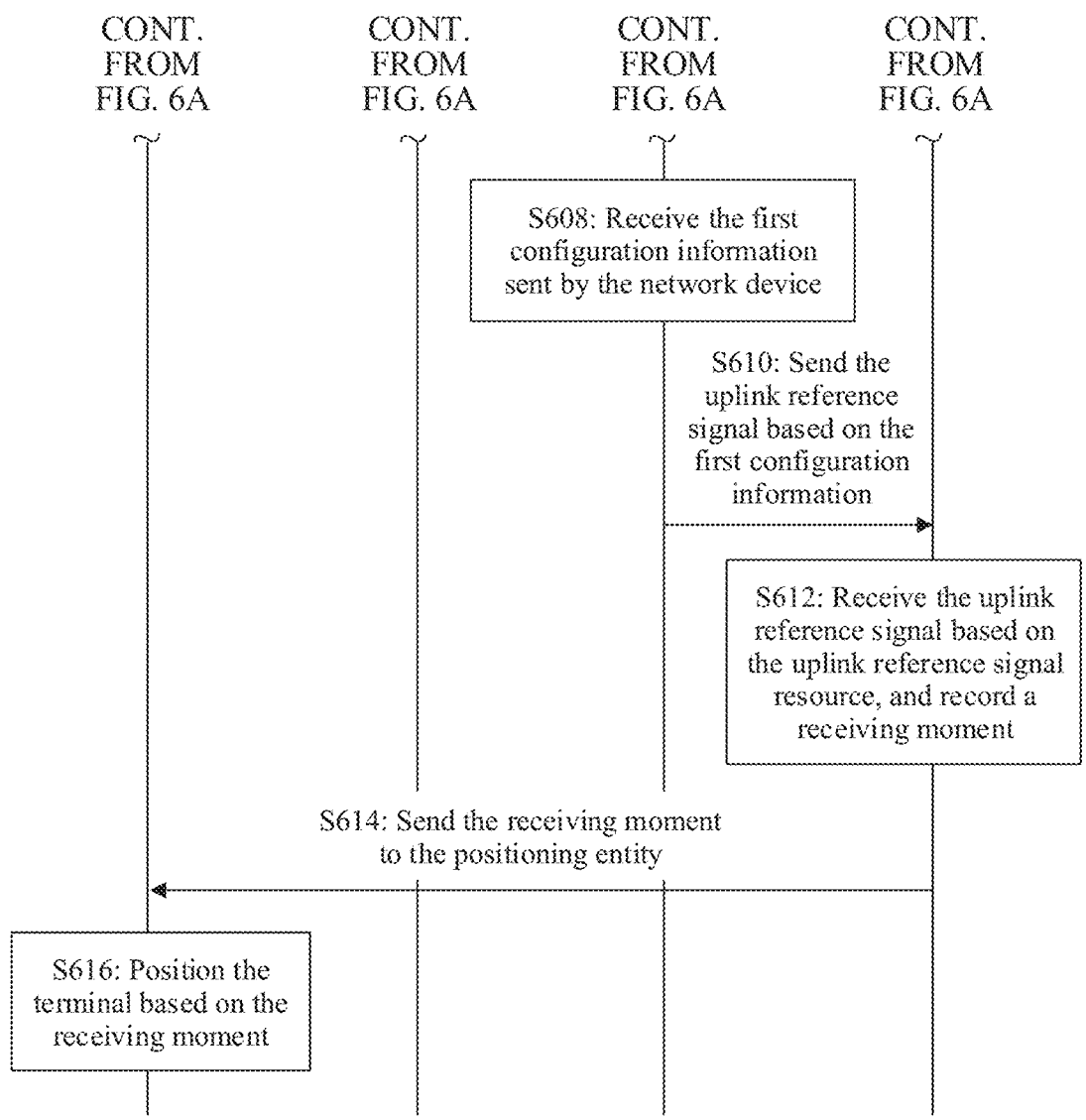

FIG. 6A and FIG. 6B are a schematic interaction flowchart of an information processing method according to this application. As shown in FIG. 6A and FIG. 6B, the method may include the following steps.

S602: A positioning entity sends positioning request information for a terminal to a network device.

The positioning request information carries information about a terminal that needs to be positioned. In addition, in a possible implementation scenario, the positioning request information may further carry identification information of some candidate LMUs selected by the positioning entity.

Identification information of an LMU in this application may include but is not limited to at least one of the following: a physical cell identifier (Physical Cell Identifier, PCI); a cell global identifier (E-UTRAN Cell Global Identifier, ECGI); a frequency; whether an uplink supplementary band (supplement UpLink, SUL) is supported; and a sequence number of a downlink reference signal. The identification information of the LMU as above can identify the LMU. In a specific implementation, the LMU could be uniquely determined only by using an identifier of a LMU as above.

It should be further noted that the implementation procedure shown in FIG. 6A and FIG. 6B is a possible implementation, and step S604 may be performed after a positioning request sent by the positioning entity is received, that is, step S604 may be performed after step S602. However, a trigger condition of step S604 is not limited in this application. The trigger that is performed after the positioning request information is received and that is shown in FIG. 6A and FIG. 6B is merely a possible implementation. In another possible implementation scenario, S604 may be triggered by another preset condition, for example, an instruction.

S604: The network device generates first configuration information of an uplink reference signal, where the first configuration information includes a first mapping relationship between an uplink reference signal resource and first information, the first information is information about a downlink reference signal of a location measurement unit LMU, and the LMU is an LMU other than a serving base station.

The uplink reference signal resource is mainly a time-frequency resource, a direction, and an associated base station. The downlink reference signal may be a synchronization signal and PBCH block (synchronization signal and PBCH block, SSB for short), a channel state information-reference signal (channel state information-reference signal, CSI-RS), or a positioning reference signal (positioning reference signal, PRS), where a PBCH is a physical broadcast channel (physical broadcast channel).

It may be understood that a specific type of the downlink reference signal is not limited in this embodiment of this application, and may be selected based on an actual situation.

S606: The network device sends the first configuration information to the terminal.

S608: The terminal receives the first configuration information sent by the network device.

S610: The terminal sends the uplink reference signal based on the first configuration information.

Specifically, the terminal may send, based on first mapping relationships in the first configuration information, the uplink reference signal on an uplink reference signal resource included in any first mapping relationship and in a beam direction indicated by first information corresponding to the uplink reference signal resource.

Preferably, the uplink reference signal may be an SRS signal. In this case, the uplink reference signal resource is an SRS resource.

S612: A target LMU receives the uplink reference signal based on the uplink reference signal resource, and records a receiving moment.

It should be noted that only necessary steps of the target LMU during positioning measurement are shown in the procedure shown in FIG. 6A and FIG. 6B. A procedure of another LMU is not particularly limited in this application. In addition, FIG. 6A and FIG. 6B show only one target LMU because implementation steps of target LMUs are the same. This is not used to limit a quantity of target LMUs in this application.

S614: The target LMU sends the receiving moment to the positioning entity.

S616: The positioning entity positions the terminal based on the receiving moment.

The following specifically describes the first mapping relationship included in the first configuration information in S604.

In this application, the uplink reference signal resource in the first mapping relationship is configured by the network device for the terminal. Before performing this step, the network device further needs to determine (determine) the uplink reference signal resource of the terminal. The first information is the information about the downlink reference signal of the LMU. Because a signal in an NR system is sent in a form of a beam, the downlink reference signal that is of the LMU and that can be received by the terminal definitely corresponds to one or more beam directions. In other words, the first information can be used to indicate a beam direction of an LMU beam that can be received by the terminal. Therefore, after receiving the first configuration information, the terminal may send the uplink reference signal (hereinafter referred to as a positioning signal for short) on the uplink reference signal resource indicated in the first configuration information. However, based on the first mapping relationship, the terminal may send the positioning signal on the uplink reference signal resource and in a beam direction indicated by the first information, and the positioning signal can be received by an LMU in the beam direction, so that UTDOA-based positioning can be implemented.

In an implementation scenario, the first information may be number information or index information of the downlink reference signal of the LMU that can be measured by the terminal. For example, the first information may be a beam number or a beam index of an LMU 1. In this case, if the terminal can obtain a downlink reference signal of an LMU through measurement, it indicates that data sent in one or more beam directions corresponding to the downlink reference signal of the LMU can be received by the terminal, and the terminal can determine a number or an index of the beam direction. In this way, when the terminal needs to send the positioning signal, data can be received by the LMU provided that the terminal sends the data in one or more beam directions corresponding to the beam number.

Based on this, before the network device generates the first configuration information, the method may further include the following step: obtaining the first information in the first configuration information. An essence of obtaining the first information is obtaining information about an LMU that can be used for positioning measurement.

This application specifically provides the following several manners of obtaining the first information by the network device.

In a first manner, the first information is obtained by the terminal through measurement. In addition, before the terminal performs measurement, the positioning entity has selected some LMUs. In this case, the network device receives, before performing S604, the identification information that is of the LMU and that is sent by the positioning entity. For example, the positioning request information sent by the positioning entity to the network device may carry the identification information of the LMU.

It should be noted that the LMU (hereinafter referred to as a candidate LMU for short) that has the identification information of the LMU sent by the positioning entity to the network device before S604 is performed may be different from an LMU (hereinafter referred to as the target LMU for short) that finally reports the receiving moment. Because the positioning entity is uncertain about a location of the terminal, and the candidate LMU sent by the positioning entity to the network device may fail to receive the positioning signal of the terminal, the two LMUs may be different.

In addition, the positioning entity may determine the candidate LMUs based on a location of the current serving base station of the terminal. To be specific, the positioning entity determines, based on a geographical location of the terminal, the candidate LMUs that perform positioning measurement on the terminal, and then the positioning entity sends the positioning request information to the network device. The positioning request information carries the identification information of the LMU.

For example, the network device is the current serving base station of the terminal. When the positioning entity needs to position the terminal, the positioning entity may search for an LMU in a preset range around the serving base station, use an LMU found in the preset range as a candidate LMU, and send an identifier of the candidate LMU to the serving base station.

Figure 7A:
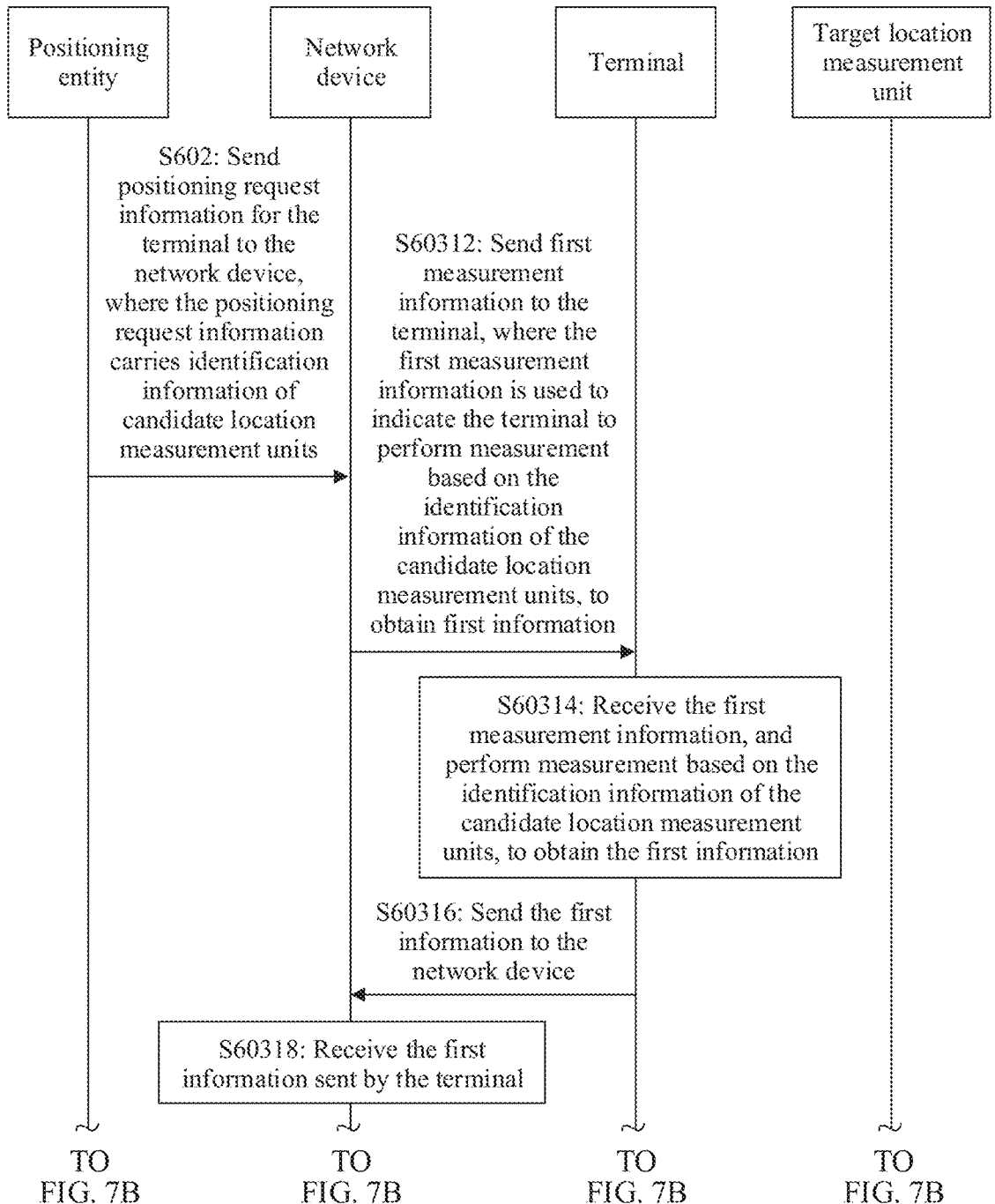
FIG. 7A and FIG. 7B are a schematic interaction flowchart of another information processing method according to this application.
Figure 7B:
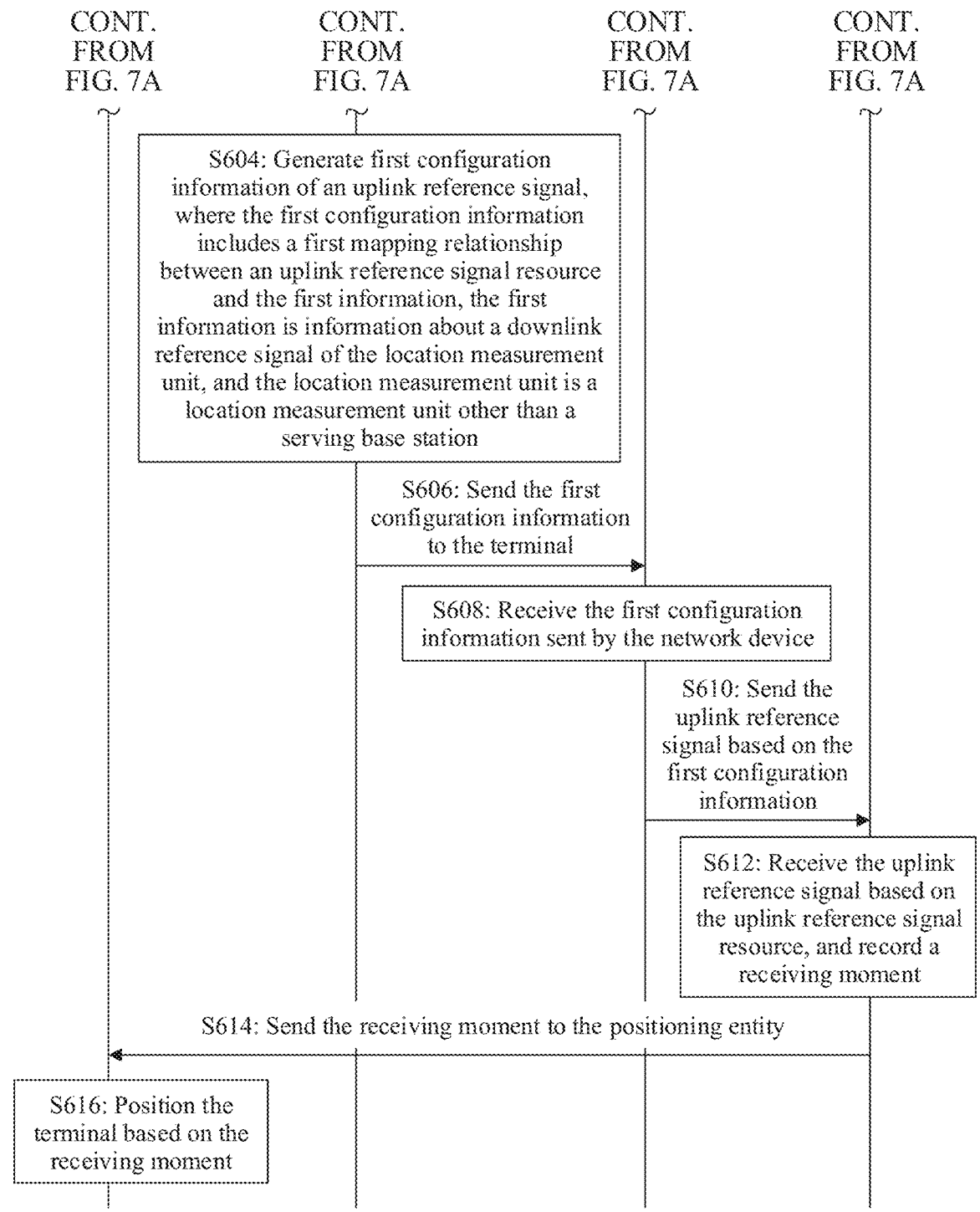

The information processing method shown in FIG. 7A and FIG. 7B shows a manner of obtaining the first information. As shown in FIG. 7A and FIG. 7B, the positioning request information sent by the positioning entity carries identification information of the candidate LMUs. In this case, before S604 is performed, the method further includes the following steps.

S60312: The network device sends first measurement information to the terminal, where the first measurement information is used to indicate the terminal to perform measurement based on the identification information of the candidate LMUs, to obtain the first information.

S60314: The terminal receives the first measurement information, and performs measurement based on the identification information of the candidate LMUs, to obtain the first information.

S60316: The terminal sends the first information to the network device.

S60318: The network device receives the first information sent by the terminal.

The terminal may perform LMU measurement by sending a measurement signal to the LMU and receiving a measurement feedback signal. If the terminal can receive the measurement feedback signal sent by the LMU, the terminal uses, as the first information, coding information or index information of a beam on which the LMU sends the measurement feedback signal. Otherwise, if the terminal cannot receive the measurement feedback signal from the LMU, the terminal cannot measure the LMU, and cannot obtain beam direction information of the LMU.

In other words, for the first information, the terminal measures the candidate LMUs determined by the positioning entity, uses, as the first information, information about all or some LMUs that can be measured by the terminal and that are in the candidate LMUs, and sends the first information to the network device. The first mapping relationship between the first information and the uplink reference signal resource is exactly used to indicate the terminal how to send the positioning signal. It can be learned that if the terminal can receive, in the beam direction indicated by the first information, the measurement feedback signal sent by the LMU, when positioning measurement is performed, the positioning signal sent by the terminal in directions corresponding to the beam direction in pairs can also be received by the LMU. In this way, the first configuration information configured by the network device can meet a communication requirement between the terminal and the LMU, that is, the terminal can send positioning signals to the LMUs, and the LMUs can also receive the positioning signals sent by the terminal.

In addition, in the implementation, a range in which the terminal performs LMU measurement is limited, and the terminal only needs to perform measurement in candidate LMUs indicated by the positioning entity. Compared with an LMU measurement manner without a range limitation, this reduces a workload of LMU measurement performed by the terminal, and helps improve processing efficiency.

In addition, in an extreme implementation scenario, the following case may exist. When performing LMU measurement based on the identification information of the LMU, the terminal cannot measure any candidate LMU. In other words, none of the candidate LMUs indicated by the positioning entity can receive the measurement signal sent by the terminal. In this case, the following second or third manner is used to obtain the first information.

In the second manner, the first information is obtained by the terminal through measurement, and the positioning entity does not indicate the identification information of the candidate LMUs.

Figure 8A:
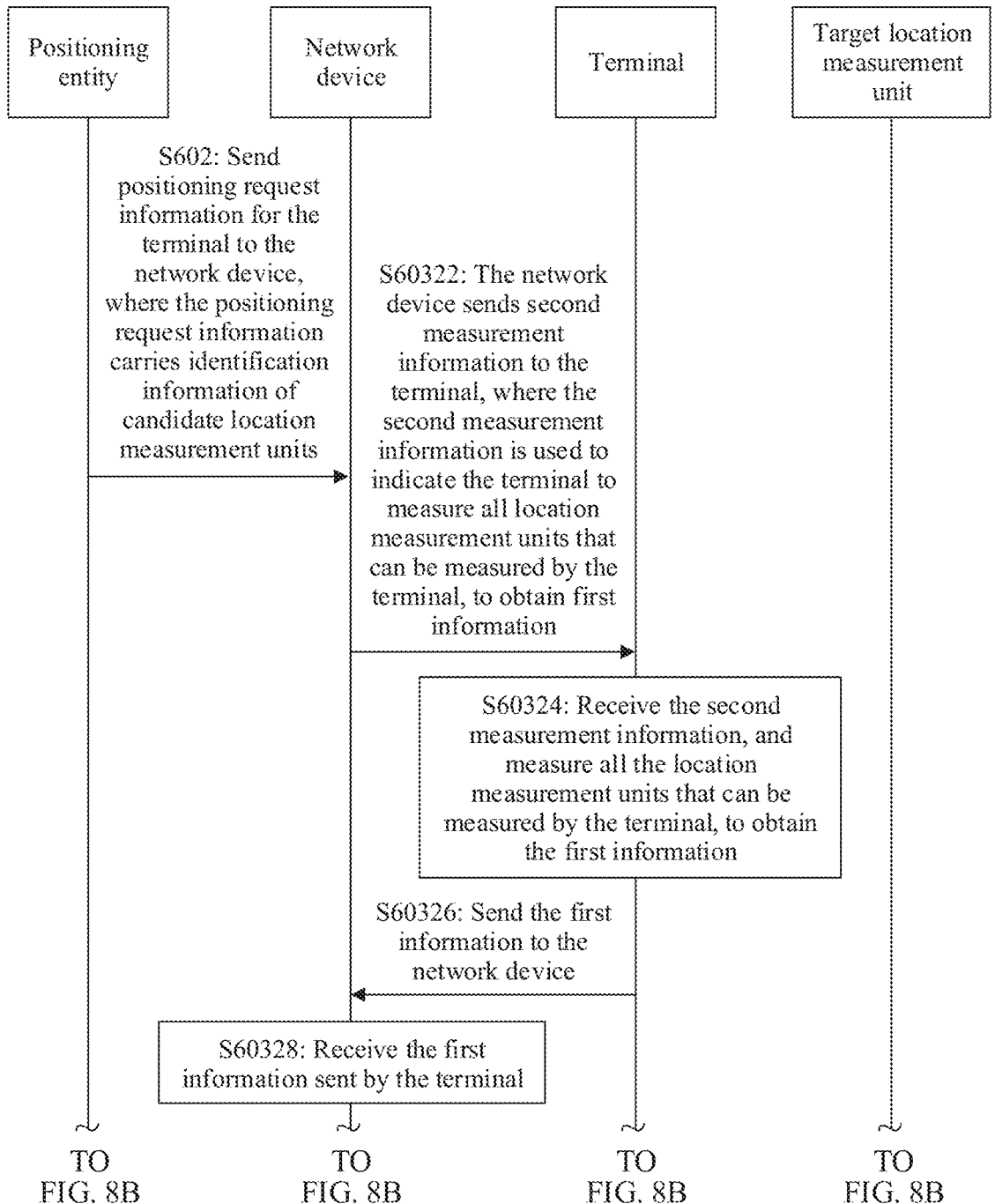
FIG. 8A and FIG. 8B are a schematic interaction flowchart of another information processing method according to this application.
Figure 8B:
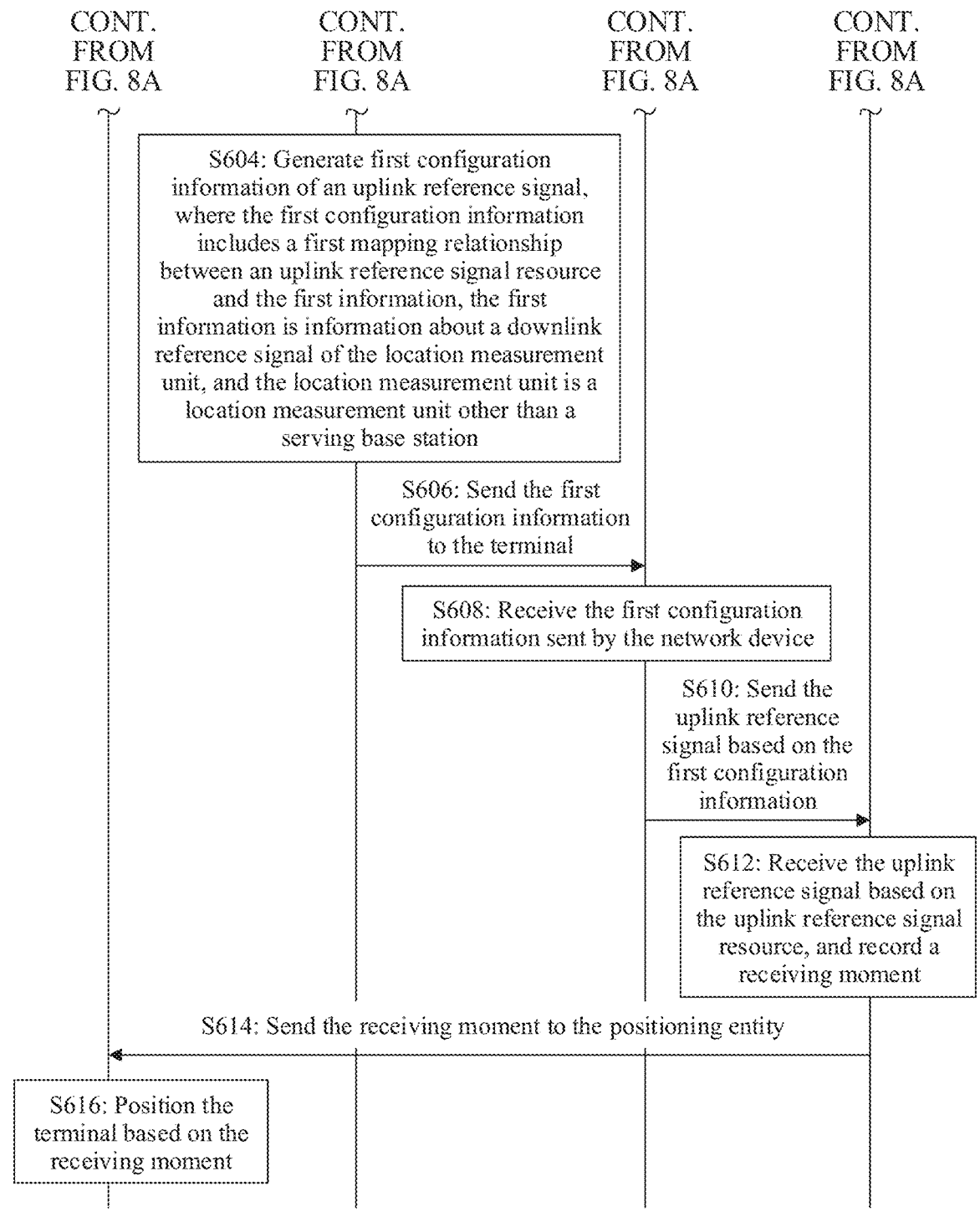

The information processing method shown in FIG. 8A and FIG. 8B shows another manner of obtaining the first information. As shown in FIG. 8A and FIG. 8B, before S604 is performed, the method further includes the following steps.

S60322: The network device sends second measurement information to the terminal, where the second measurement information is used to indicate the terminal to perform LMU measurement on all LMUs that can be measured by the terminal, to obtain the first information.

S60324: The terminal receives the second measurement information, and measures all the LMUs that can be measured by the terminal, to obtain the first information.

In other words, after receiving the second measurement information, the terminal performs measurement on frequencies at which downlink reference signals of all potential LMUs are located, to obtain the first information.

S60326: The terminal sends the first information to the network device.

S60328: The network device receives the first information sent by the terminal.

In other words, the first configuration information is generated by the network device based on all the LMUs that can be measured by the terminal. In the implementation, for the terminal, a case in which an LMU that can be used for positioning cannot be measured during measurement within a preset range is avoided, and the terminal can obtain, by performing LMU measurement only once, all the LMUs that can be measured by the terminal. In addition, this manner helps increase a quantity of LMUs corresponding to the first information, and a larger quantity of LMUs used for positioning helps improve positioning accuracy.

In addition, the manner shown in FIG. 8A and FIG. 8B can be used as a supplemental manner of the manner shown in FIG. 7A and FIG. 7B. To be specific, if the terminal receives the first measurement information, and performs LMU measurement based on the identification information of the LMU in the first measurement information, but cannot measure any LMU, in one manner, the terminal may feed back an LMU measurement status to the network device, and perform, based on the second measurement information sent by the network device, a measurement procedure shown in FIG. 8A and FIG. 8B, and complete reporting of the first information; in another manner, the terminal may perform the measurement step in S60324, and send the first information to the network device. In this implementation, the first information may be further described, so that the network device is notified that the first information is obtained by performing LMU measurement on all LMUs that can be measured by the network device.

During actual implementation of the foregoing first manner and second manner, information about an LMU that can be actually measured by the terminal is used as the first information. This ensures that the first configuration information configured by the network device can meet a communication requirement between the terminal and the LMU, that is, the terminal can send positioning signals to the LMUs, and the LMUs can also receive the positioning signals sent by the terminal.

In addition, this application further provides a more implementation of the two implementations. After performing LMU measurement (performing LMU measurement based on the identification information of the LMU, or performing LMU measurement in a range of all the LMUs that can be measured by the terminal), the terminal selects information about some LMUs in all the measured LMUs as the first information, where strength of signals of the some LMUs corresponding to the first information is greater than or equal to a preset signal strength threshold. The terminal filters the measured LMUs based on signal strength, and uses only some LMUs with relatively high signal strength as LMUs that can be used for positioning measurement, to avoid a case in which a receiving moment is affected due to signal strength in a positioning measurement process.

In the third manner, the first information is determined based on historical measurement information that is of LMU measurement previously performed by the terminal and that is sent by the terminal.

Figure 9:
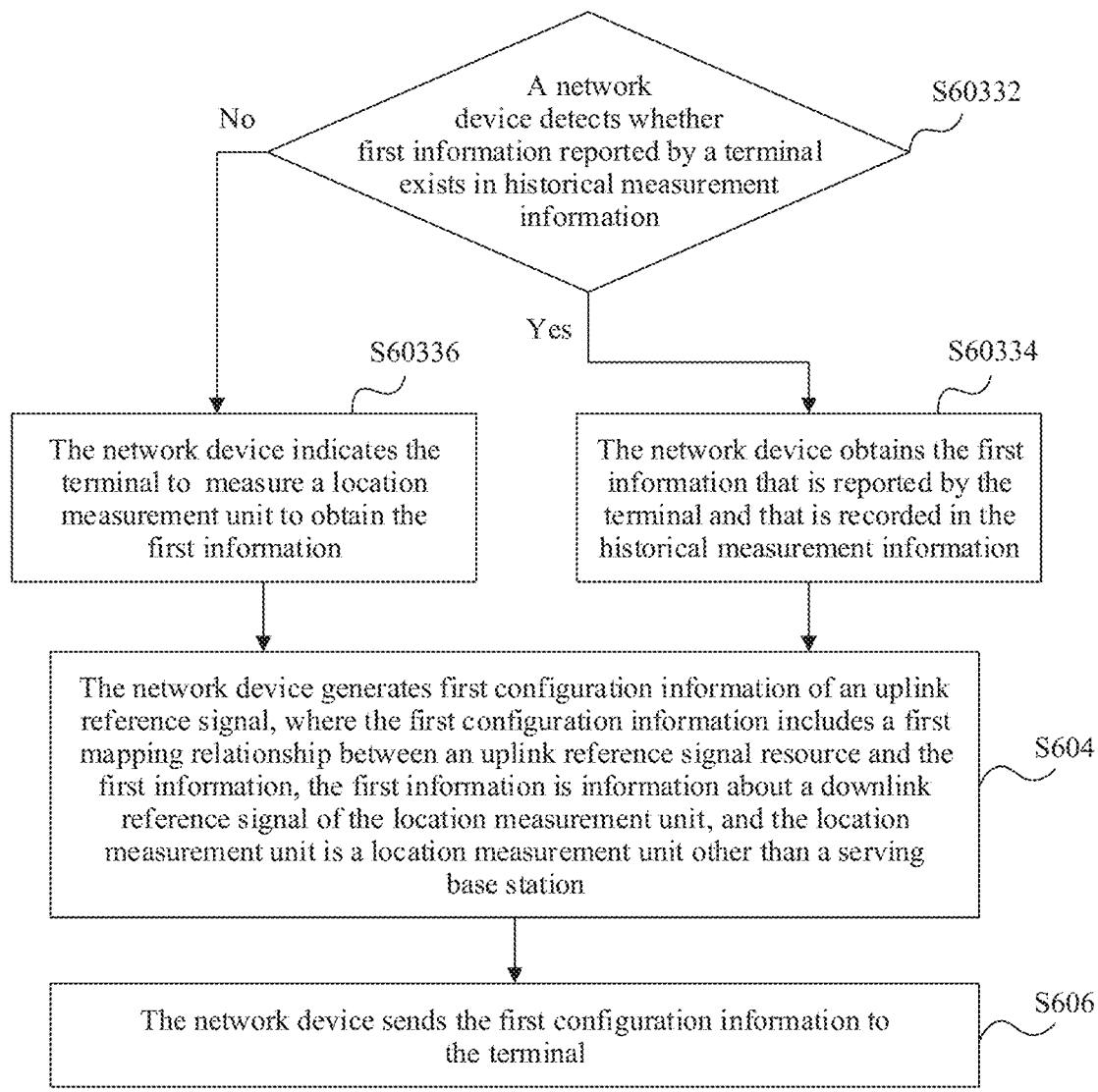
FIG. 9 is a schematic interaction flowchart of another information processing method according to this application.

The information processing method shown in FIG. 9 shows another manner of obtaining the first information. As shown in FIG. 9, before S604 is performed, the method further includes the following steps.

S60332: The network device detects whether the first information reported by the terminal exists in the historical measurement information, if the network device detects the first information, performs S60334, and if the network device does not detect the first information, performs S60336.

The historical measurement information is measurement information that is of measurement previously performed by the terminal and that is sent to the network device.

S60334: The network device obtains the first information that is reported by the terminal and that is recorded in the historical measurement information.

S60336: The network device indicates the terminal to perform LMU measurement to obtain the first information.

It can be learned that S60334 and S60336 are parallel implementation steps, and either of the two steps may be performed during actual implementation. In addition, step S60336 may be implemented in the foregoing first manner and/or second manner, and details are not described again.

In the implementation shown in FIG. 9, the terminal does not need to be requested to perform LMU measurement before the first configuration information is generated, thereby simplifying processing steps before the first configuration information is generated, helping improve processing efficiency, and reducing system resources.

In addition, the implementation shown in FIG. 9 may further have a implementation: The network device may alternatively select, from all LMU information that is reported by the terminal and that is recorded in the obtained historical measurement information based on signal strength of the LMUs, some LMUs whose signal strength is greater than or equal to the preset signal strength threshold, use information about the selected some LMUs as the first information, and generate the first configuration information based on the first information.

In addition to the foregoing three manners of obtaining the first information, in an implementation scenario, considering that UTDOA-based positioning measurement generally needs receiving moments fed back by at least N LMUs, where N is a minimum quantity of LMUs required for UTDOA positioning measurement, during actual implementation, the network device may further verify whether a quantity of LMUs corresponding to the first information meets the minimum quantity.

In this case, the method further includes the following steps: The network device determines whether the quantity of LMUs corresponding to the first information is greater than or equal to the minimum quantity of LMUs required for positioning measurement: if the quantity of LMUs is less than the minimum quantity, the network device sends a notification message to the positioning entity, where the notification message is used to notify the positioning entity that a current location of the terminal does not meet a positioning condition. Otherwise, if the quantity of LMUs is greater than or equal to the minimum quantity, UTDOA positioning measurement may be implemented according to the steps shown in FIG. 6A to FIG. 9. In the manner, it can be ensured that the first configuration information that is configured by the network device and that is sent to the terminal can meet a minimum requirement of UTDOA positioning measurement, thereby avoiding a case in which positioning cannot be performed because there are not sufficient LMUs and thus there are not sufficient receiving moments when the positioning entity positions the terminal.

In addition, after obtaining the first information, the network device may determine LMUs that can be used for positioning measurement. It should be noted that the LMUs that can be used for positioning measurement are also different from the target LMU in terms of names, and the LMUs that can be used for positioning measurement may be the same as or may be different from the target LMU in terms of function. However, the LMUs that can be used for positioning measurement include the target LMU. This is because the first configuration information is only used to indicate an uplink reference signal resource on which the terminal sends the positioning signal and a beam direction in which the terminal sends the positioning signal, and the terminal cannot determine LMUs that are specifically used by the positioning entity to send the receiving moment and finally position the terminal.

Therefore, this solution can be implemented by including only the first mapping relationship in the generated first configuration information. This is because in a positioning measurement process, the terminal does not need to determine an LMU corresponding to each beam direction, and this is not mandatory for the terminal.

Certainly, in an implementation scenario, the first configuration information may alternatively carry a second mapping relationship, and the second mapping relationship is a mapping relationship between the uplink reference signal resource and the LMU. For example, the second mapping relationship may be a mapping relationship between the uplink reference signal resource and the identification information of the LMU. For another example, the second mapping relationship may be a mapping relationship between the uplink reference signal resource and a number of the LMU. In this implementation scenario, the mapping relationship included in the first configuration information may be: the uplink reference signal resource—the number information or the index information of the downlink reference signal of the LMU that can be measured by the terminal—the LMU. In this case, the terminal may determine, based on the first configuration information, a receiver and a beam direction of the positioning signal sent by the terminal. This is more targeted.

In addition to the first configuration information generated and sent by the terminal, the network device may further feed back a response message to the positioning entity based on the uplink reference signal resource that has been determined to be configured for the terminal.

Figure 10A:
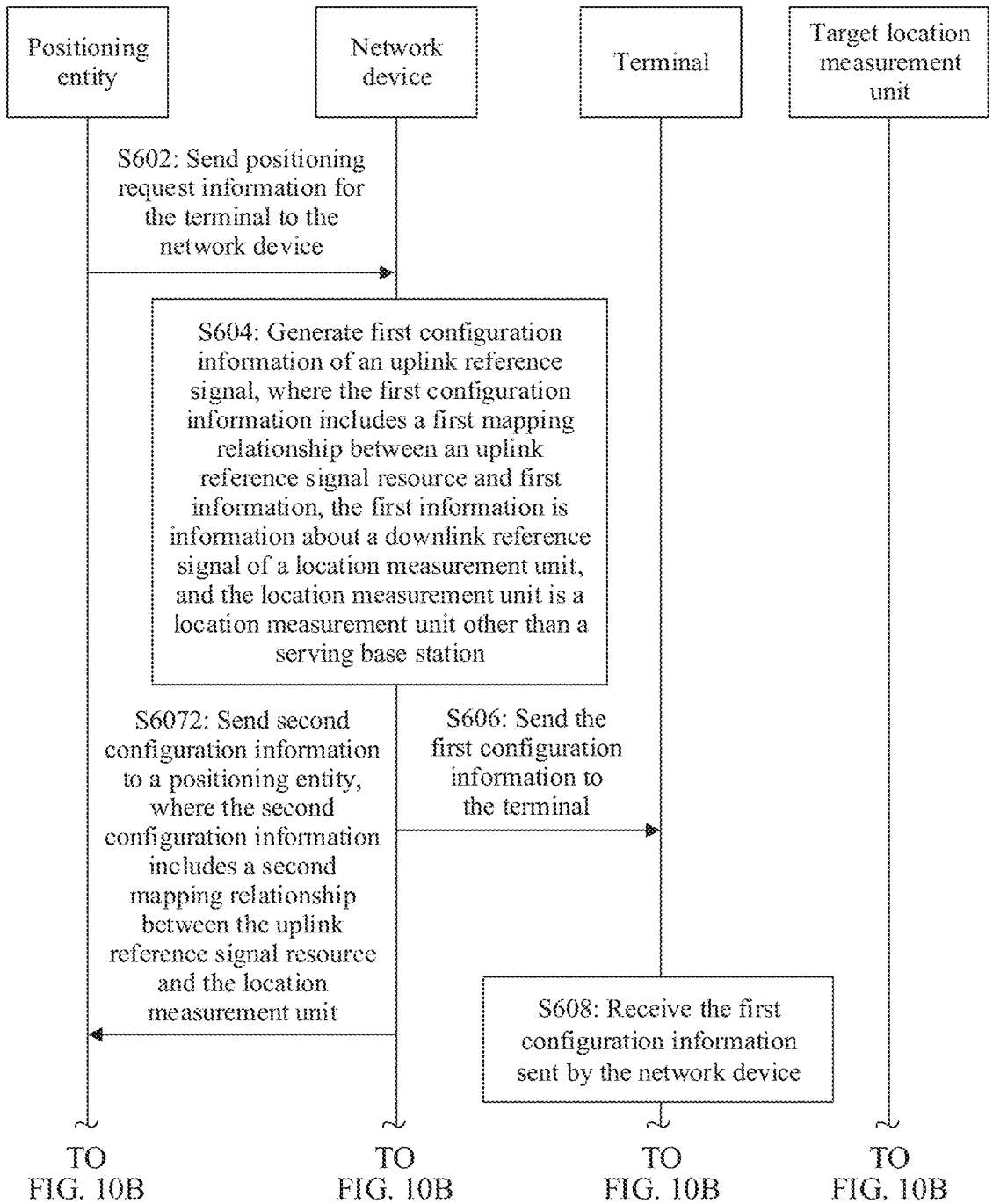
FIG. 10A and FIG. 10B are a schematic interaction flowchart of another information processing method according to this application.
Figure 10B:
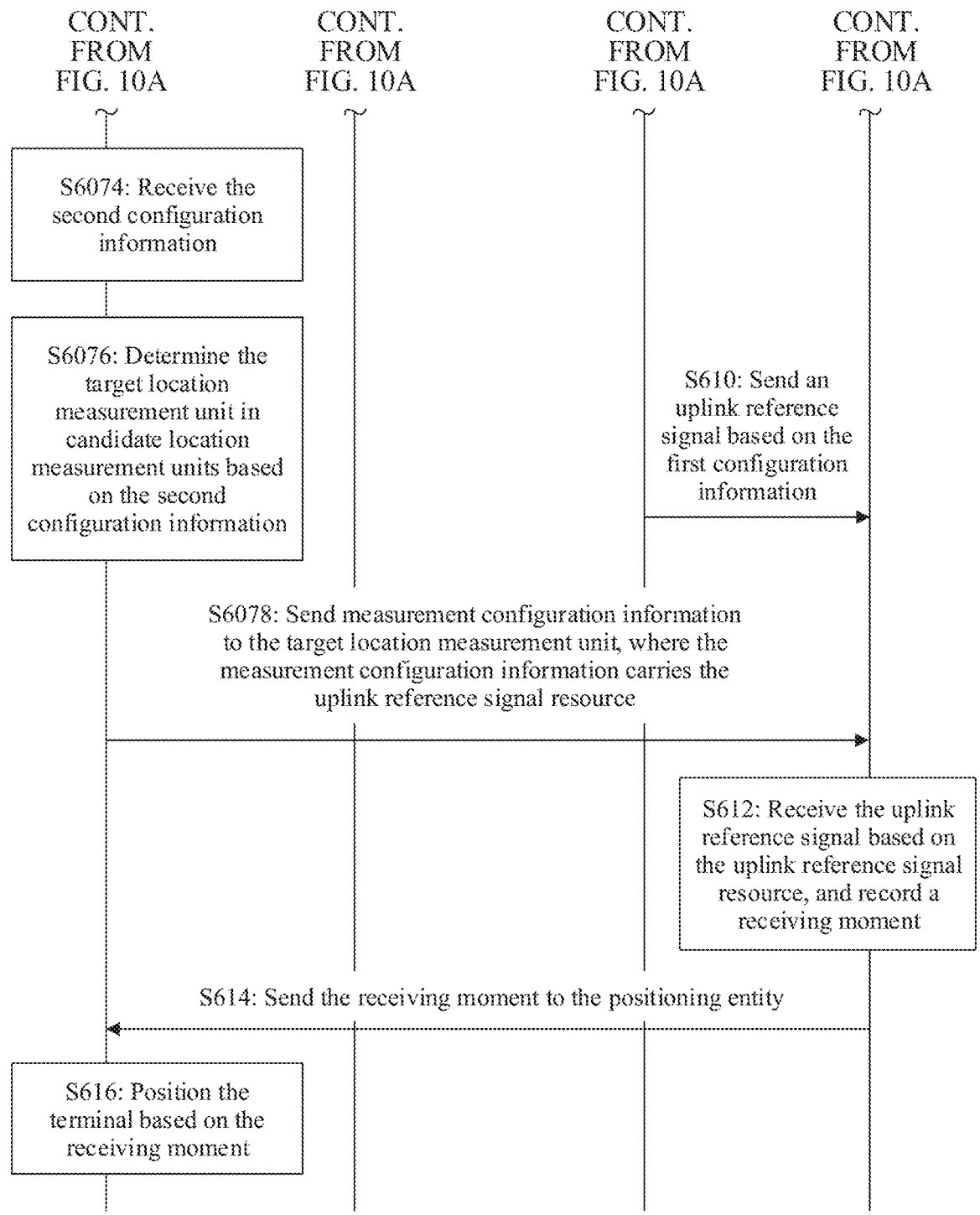

In this case, refer to a schematic flowchart of an information processing method shown in FIG. 10A and FIG. 10B. As shown in FIG. 10A and FIG. 10B, in addition to the procedure shown in FIG. 6A and FIG. 6B, the method further includes the following steps.

S6072: The network device sends second configuration information to the positioning entity, where the second configuration information includes the second mapping relationship between the uplink reference signal resource and the LMU.

S6074: The positioning entity receives the second configuration information.

S6076: The positioning entity determines the target LMU in all the candidate LMUs based on the second configuration information.

In other words, when determining the target LMU, the positioning entity can perform selection and determining only in candidate LMUs reported by the network device. In this application, a principle for determining the target LMU is not limited. The target LMU may be determined according to a preset algorithm, for example, the foregoing algorithm for comparing the signal strength of the LMU with the preset threshold. Alternatively, the target LMU may be determined based on a location of the LMU. Alternatively, the candidate LMUs may be output to a processing personnel, and the processing personnel may manually select the target LMU.

S6078: The positioning entity sends measurement configuration information to the target LMU, where the measurement configuration information carries the uplink reference signal resource.

In an implementation scenario, the second configuration information further includes the first mapping relationship. In this case, the positioning entity may further determine a beam direction corresponding to each uplink reference signal resource, so that a case in which a positioning signal is incorrectly received at the target LMU can be avoided to some extent. In this way, when the first configuration information also includes the second mapping relationship, the first configuration information is the same as the second configuration information, and all mapping relationships included in the second configuration information may be: the uplink reference signal resource—the number information or the index information of the downlink reference signal of the LMU that can be measured by the terminal—the LMU.

In an implementation shown in FIG. 10A and FIG. 10B, the second configuration information sent by the network device is mainly used to notify the positioning entity of uplink reference signal resources on which the terminal sends the positioning signal and a relationship between the uplink reference signal resources and the LMU. In this way, in this implementation solution, the positioning entity may freely select the target LMU, to be specific, can select an LMU that better meets a positioning requirement of the positioning entity as the target LMU.

The implementation shown in FIG. 10A and FIG. 10B may be combined with any one of the foregoing plurality of implementations, and details are not described again. However, the network device sends and configures the first configuration information and the second configuration information, so that each finally determined target LMU can actually receive the positioning signal sent by the terminal. In this way, each target LMU can record the receiving moment, and send the receiving moment to the positioning entity, and the positioning entity positions the terminal based on a preset algorithm, thereby resolving a problem in the prior art that UTDOA-based terminal positioning cannot be implemented in an NR system.

It may be understood that some or all of the steps or operations in the foregoing embodiments are merely examples. Other operations or variations of various operations may be further performed in the embodiments of this application. In addition, the steps may be performed in different sequences presented in the foregoing embodiments, and it is possible that not all operations in the foregoing embodiments need to be performed.

It may be understood that, in the foregoing embodiments, an operation or a step that is implemented by the terminal may also be implemented by a component (for example, a chip or a circuit) that can be used in the terminal, an operation or a step that is implemented by the core network node may also be implemented by a component (for example, a chip or a circuit) that can be used in the core network node, and an operation or a step that is implemented by the network device may also be implemented by a component (for example, a chip or a circuit) that can be used in the network device.

Figure 11:
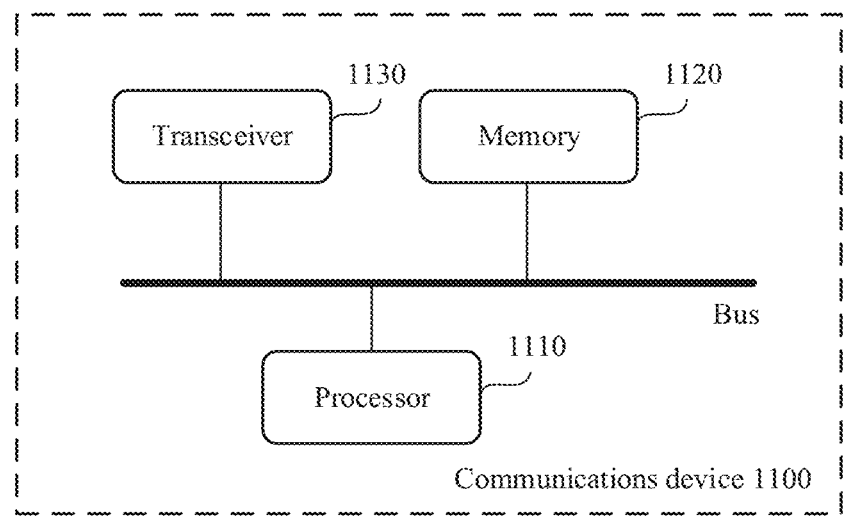
FIG. 11 is a schematic structural diagram of a communications device according to this application.

FIG. 11 is a schematic structural diagram of a communications device. The communications device may be configured to implement the method part corresponding to the network device, the method part corresponding to the positioning entity, the method part corresponding to the terminal, or the method part corresponding to the target LMU described in the foregoing method embodiments. For details, refer to descriptions in the foregoing method embodiments.

The communications device 1100 may include one or more processors 1110. The processor 1110 may also be referred to as a processing unit, and can implement a specific control function. The processor 1110 may be a general purpose processor, a dedicated processor, or the like.

In an optional design, the processor 1110 may alternatively store a first instruction, and the first instruction may be run by the processor, so that the communications device 1100 performs the method that corresponds to the network device, the positioning entity, the terminal, or the target LMU and that is described in the foregoing method embodiments.

A processing element herein may be a general purpose processor, for example, a central processing unit (Central Processing Unit, CPU), or may be configured as one or more integrated circuits that perform the foregoing methods, for example, one or more application-specific integrated circuits (Application Specific Integrated Circuit, ASIC), one or more microprocessors (digital signal processor, DSP), one or more field programmable gate arrays (Field Programmable Gate Array, FPGA), or the like. A storage element may be one memory, or may be a general term of a plurality of storage elements.

In another possible design, the communications device 1100 may include a circuit. The circuit may implement a sending, receiving, or communication function in the foregoing method embodiments.

Optionally, the communications device 1100 may include one or more memories 1120, where the memory 1120 stores a second instruction or intermediate data, and the second instruction may be run on the processor, so that the communications device 1100 performs the method described in the foregoing method embodiments. Optionally, the memory may further store other related data. Optionally, the processor may also store an instruction and/or data. The processor and the memory may be separately disposed, or may be integrated together.

Optionally, the communications device 1100 may further include a transceiver 1130. The transceiver 1130 may be referred to as a transceiver unit, a transceiver machine, a transceiver circuit, a transceiver, or the like, and is configured to implement sending and receiving functions of the communications device.

In the communications device 1100, the processor 1110, the memory 1120, and the transceiver 1130 are connected by using a bus.

When the communications device 1100 is configured to implement an operation corresponding to the network device in the embodiments shown in FIG. 6A to FIG. 10B, for example, the processor may be configured to generate the first configuration information of the uplink reference signal, the transceiver may send the first configuration information to the terminal, and the transceiver may be further configured to receive the positioning request information sent by the positioning entity. The transceiver may further complete another corresponding communication function. The processor is configured to complete a corresponding determining or control operation, and optionally, may further store a corresponding instruction in the memory. For a specific processing manner of each component, refer to the related descriptions in the foregoing embodiments.

When the communications device 1100 is configured to implement an operation corresponding to the positioning entity in FIG. 6A to FIG. 10B, for example, the transceiver may send the positioning request information to the network device, the transceiver may receive the second configuration information sent by the network device, the processor may determine the target LMU, and the processor may determine the candidate LMUs. The transceiver may further complete another corresponding communication function. The processor is configured to complete a corresponding determining or control operation, and optionally, may further store a corresponding instruction in the memory. For a specific processing manner of each component, refer to the related descriptions in the foregoing embodiments.

When the communications device 1100 is configured to implement an operation corresponding to the terminal in the embodiments shown in FIG. 6A to FIG. 10B, the transceiver is configured to: send the first configuration information, and send the uplink reference signal (the positioning signal) based on the first configuration information. Optionally, the transceiver may be further configured to complete another related communication operation, and the processor may be further configured to complete another corresponding determining or control operation, for example, determine information about at least one cell, and optionally, may further store a corresponding instruction in the memory. For a specific processing manner of each component, refer to the related descriptions in the foregoing embodiments.

When the communications device 1100 is configured to implement an operation corresponding to the target LMU in the embodiments shown in FIG. 6A to FIG. 10B, the transceiver is configured to receive the measurement configuration information sent by the positioning entity, and is configured to send the receiving moment to the positioning entity, and the processor is configured to record the receiving moment. Optionally, the transceiver may be further configured to complete another related communication operation, and the processor may be further configured to complete another corresponding determining or control operation, and optionally, may further store a corresponding instruction in the memory. For a specific processing manner of each component, refer to the related descriptions in the foregoing embodiments.

The processor and the transceiver described in this application may be implemented on an integrated circuit (integrated circuit, IC), an analog IC, a radio frequency integrated circuit RFIC, a hybrid signal IC, an application-specific integrated circuit (application specific integrated circuit, ASIC), a printed circuit board (printed circuit board, PCB), an electronic device, or the like. The processor and the transceiver may also be manufactured by using various IC technologies, for example, a complementary metal oxide semiconductor (complementary metal oxide semiconductor, CMOS), an n-type metal oxide semiconductor (n-type Metal-oxide-semiconductor, NMOS), a p-type metal oxide semiconductor (p-type channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

Optionally, the communications device may be an independent device or may be a part of a relatively large device. For example, the device may be:
(1) an independent integrated circuit IC, a chip, or a chip system or subsystem;
(2) a set having one or more ICs, where optionally, the IC set may also include a storage component configured to store data and/or an instruction;
(3) an ASIC, for example, a modem (MSM);
(4) a module that can be embedded in another device;
(5) a receiver, a terminal, a cellular phone, a wireless device, a handheld device, a mobile unit, a network device, or the like;
(6) another device or the like.

Figure 12:
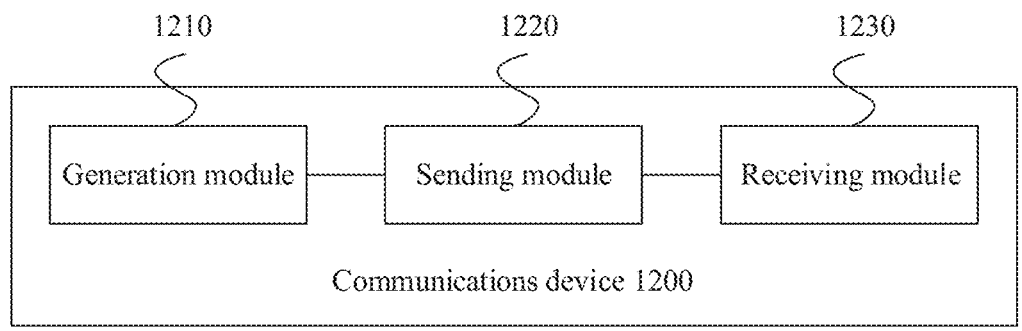
FIG. 12 is a schematic structural diagram of another communications device according to an embodiment of this application.

In addition, FIG. 12 is a schematic structural diagram of a communications device according to an embodiment of this application. As shown in FIG. 12, the communications device 1200 includes a generation module 1210 and a sending module 1220. The generation module 1210 is configured to generate first configuration information of an uplink reference signal, where the first configuration information includes a first mapping relationship between an uplink reference signal resource and first information, the first information is information about a downlink reference signal of a location measurement unit LMU, and the LMU is an LMU other than a serving base station. The sending module 1220 is configured to send the first configuration information to a terminal.

In FIG. 12, further, the sending module 1220 is further configured to: send second configuration information to a positioning entity, where the second configuration information includes a second mapping relationship between the uplink reference signal resource and the LMU.

In this application, the first information is number information or index information of the downlink reference signal of the LMU measured by the terminal.

Optionally, the communications device further includes: a receiving module 1230, configured to receive positioning request information that is sent by the positioning entity and that is for the terminal.

In a possible manner, the positioning request information carries identification information of the LMU.

In this case, the sending module 1220 is further configured to send first measurement information to the terminal, where the first measurement information is used to indicate the terminal to perform LMU measurement based on the identification information of the LMU, to obtain the first information: and the receiving module 1230 is further configured to receive the first information sent by the terminal.

In this application, the identification information of the LMU includes at least one of the following:
  a physical cell identifier PCI;
  a cell global identifier ECGI;
  a frequency; and
  whether an uplink supplementary band SUL is supported.

In another possible manner, the sending module 1220 is further configured to send second measurement information to the terminal, where the second measurement information is used to indicate the terminal to perform LMU measurement on all LMUs that can be measured by the terminal, to obtain the first information; and the receiving module 1230 is further configured to receive the first information sent by the terminal.

In another possible manner, the communications device 1200 further includes a processing module (not shown in FIG. 12), configured to detect whether the first information reported by the terminal exists in historical measurement information, where the historical measurement information is measurement information that is previously measured by the terminal and that is sent to the communications device; and if the first information reported by the terminal exists in the historical measurement information, obtain the first information that is reported by the terminal and that is recorded in the historical measurement information; or if the first information reported by the terminal does not exist in the historical measurement information, indicate the terminal to perform LMU measurement to obtain the first information.

Optionally, the LMU in the first information is a part of all the LMUs measured by the terminal, and signal strength of the LMU is greater than or equal to a preset signal strength threshold.

In another possible manner, the processing module is further configured to: determine whether a quantity of LMUs is greater than or equal to a minimum quantity of LMUs required for positioning measurement: and in this case, the sending module 1220 is further configured to send a notification message to the positioning entity if the quantity of LMUs is less than the minimum quantity, where the notification message is used to notify the positioning entity that a current location of the terminal does not meet a positioning condition.

Optionally, the second configuration information further includes the first mapping relationship.

Optionally, the first configuration information further includes the second mapping relationship between the uplink reference signal resource and the LMU.

The communications device in the embodiment shown in FIG. 12 may be configured to execute the technical solutions in the foregoing method embodiments. For an implementation principle and a technical effect of the communications device, further refer to the related descriptions in the method embodiments. Optionally, the communications device may be a network device, or may be a component (for example, a chip or a circuit) of a network device.

Figure 13:
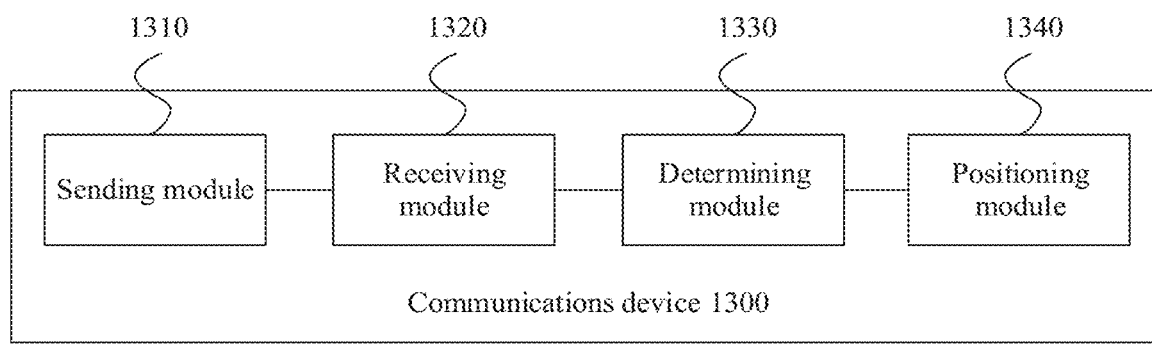
FIG. 13 is a schematic structural diagram of another communications device according to an embodiment of this application.

FIG. 13 is a schematic structural diagram of another communications device according to an embodiment of this application. As shown in FIG. 13, the communications device 1300 includes a sending module 1310, a receiving module 1320, a determining module 1330, and a positioning module 1340. The sending module 1310 is configured to send positioning request information for a terminal to a network device. The receiving module 1320 is configured to receive second configuration information, where the second configuration information includes a second mapping relationship between an uplink reference signal resource and candidate location measurement units LMUs, and the uplink reference signal resource is configured by the network device for the terminal. The determining module 1330 is configured to determine a target LMU in the candidate LMUs based on the second configuration information. The sending module 1310 is further configured to send measurement configuration information to the target LMU, where the measurement configuration information carries the uplink reference signal resource. The receiving module 1320 is further configured to receive a receiving moment that is of an uplink reference signal and that is measured by the target LMU on the uplink reference signal resource. The positioning module 1340 is configured to position the terminal based on the receiving moment.

In a possible manner, the sending module 1310 is specifically configured to: determine, based on a geographic location of the terminal, the candidate LMUs for performing positioning measurement on the terminal: and send the positioning request information to the network device, where the positioning request information carries identification information of the LMU.

Specifically, in this application, the identification information of the candidate LMU includes at least one of the following:
  a physical cell identifier PCI;
  a cell global identifier ECGI;
  a frequency; and
  whether an uplink supplementary band SUL is supported.

Optionally, the second configuration information further includes a first mapping relationship between the uplink reference signal resource and first information, the first information is information about a downlink reference signal of the location measurement unit LMU, and the LMU is an LMU other than a serving base station.

Preferably, the first information is number information or index information of the downlink reference signal of the LMU.

The communications device in the embodiment shown in FIG. 13 may be configured to execute the technical solutions in the foregoing method embodiments. For an implementation principle and a technical effect of the communications device, further refer to the related descriptions in the method embodiments. Optionally, the communications device may be a positioning entity, or may be a component (for example, a chip or a circuit) of a positioning entity.

Figure 14:
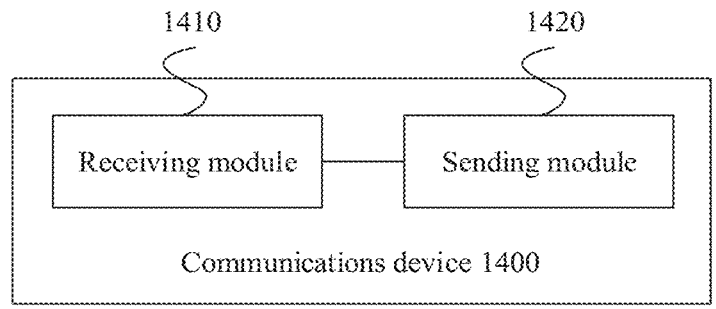
FIG. 14 is a schematic structural diagram of another communications device according to an embodiment of this application.

FIG. 14 is a schematic structural diagram of another communications device according to an embodiment of this application. As shown in FIG. 14, the communications device 1400 includes a receiving module 1410 and a sending module 1420. The receiving module 1410 is configured to receive first configuration information sent by a network device, where the first configuration information includes at least a first mapping relationship between an uplink reference signal resource and first information, the first information is information about a downlink reference signal of a location measurement unit LMU, and the LMU is an LMU other than a serving base station. The sending module 1420 is configured to send an uplink reference signal on the uplink reference signal resource indicated by the first information.

Optionally, the first configuration information further includes a second mapping relationship between the uplink reference signal resource and the LMU.

The communications device in the embodiment shown in FIG. 14 may be configured to execute the technical solutions in the foregoing method embodiments. For an implementation principle and a technical effect of the communications device, further refer to the corresponding descriptions in the method embodiments. Details are not described again. Optionally, the communications device may be a terminal, or may be a component (for example, a chip or a circuit) of a terminal.

Figure 15:
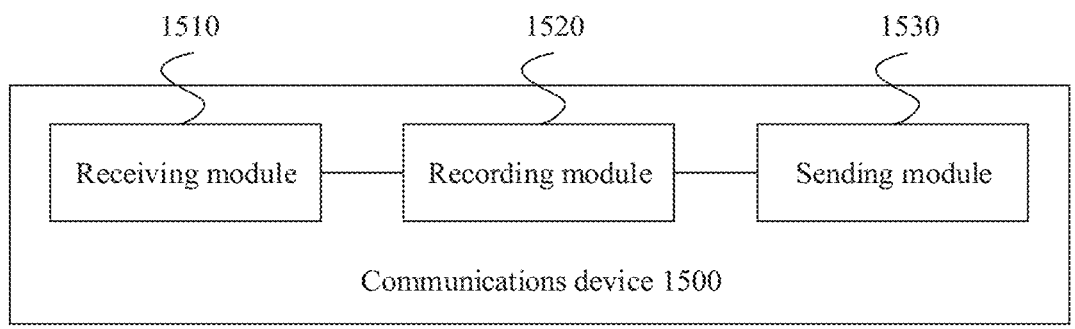
FIG. 15 is a schematic structural diagram of another communications device according to an embodiment of this application.

FIG. 15 is a schematic structural diagram of another communications device according to an embodiment of this application. As shown in FIG. 15, the communications device 1500 includes a receiving module 1510, a recording module 1520, and a sending module 1530. The receiving module 1510 is configured to receive measurement configuration information sent by a positioning entity, where the measurement configuration information carries an uplink reference signal resource. The receiving module 1510 is further configured to receive an uplink reference signal on the uplink reference signal resource. The recording module 1520 is configured to record a receiving moment of the uplink reference signal. The sending module 1530 is configured to send the receiving moment to the positioning entity.

The communications device in the embodiment shown in FIG. 15 may be configured to execute the technical solutions in the foregoing method embodiments. Their implementation principles and technical effects are similar and are not described again. The communications device may be an LMU, or may be a component (for example, a chip or a circuit) of an LMU.

It should be understood that division into the foregoing modules of the communications device shown in FIG. 12 to FIG. 15 is merely logical function division. In actual implementation, all or some of the modules may be integrated into one physical entity, or may be physically separated. In addition, all of the modules may be implemented in a form of software invoked by a processing element or in a form of hardware. Alternatively, some of the modules may be implemented in a form of software invoked by a processing element, and some of the modules may be implemented in a form of hardware. For example, the generation module may be an independently disposed processing element, or may be integrated into the communications device. For example, the generation module is implemented in a chip of a network device. In addition, the generation module may be stored in a memory of the communications device in a form of a program, and a processing element of the communications device invokes and performs functions of the foregoing modules. Implementations of other modules are similar. In addition, all or some of the modules may be integrated together, or may be implemented independently. The processing element described herein may be an integrated circuit with a signal processing capability. In an implementation process, steps in the method or the modules can be implemented by using a hardware integrated logical circuit in the processing element, or by using instructions in a form of software.

For example, the foregoing modules may be configured as one or more integrated circuits for implementing the foregoing method, for example, one or more application-specific integrated circuits (Application Specific Integrated Circuit. ASIC), one or more microprocessors (digital signal processor, DSP), or one or more field programmable gate arrays (Field Programmable Gate Array, FPGA). For another example, when one of the foregoing modules is implemented in a form of scheduling a program by a processing element, the processing element may be a general purpose processor, for example, a central processing unit (Central Processing Unit, CPU) or another processor that can invoke the program. For another example, the modules may be integrated together, and implemented in a form of a system-on-a-chip (system-on-a-chip, SOC).

An embodiment of this application further provides a communications device. The communications device may be a terminal or a circuit. The communications device may be configured to perform an action performed by the terminal in the foregoing method embodiments.

Figure 16:
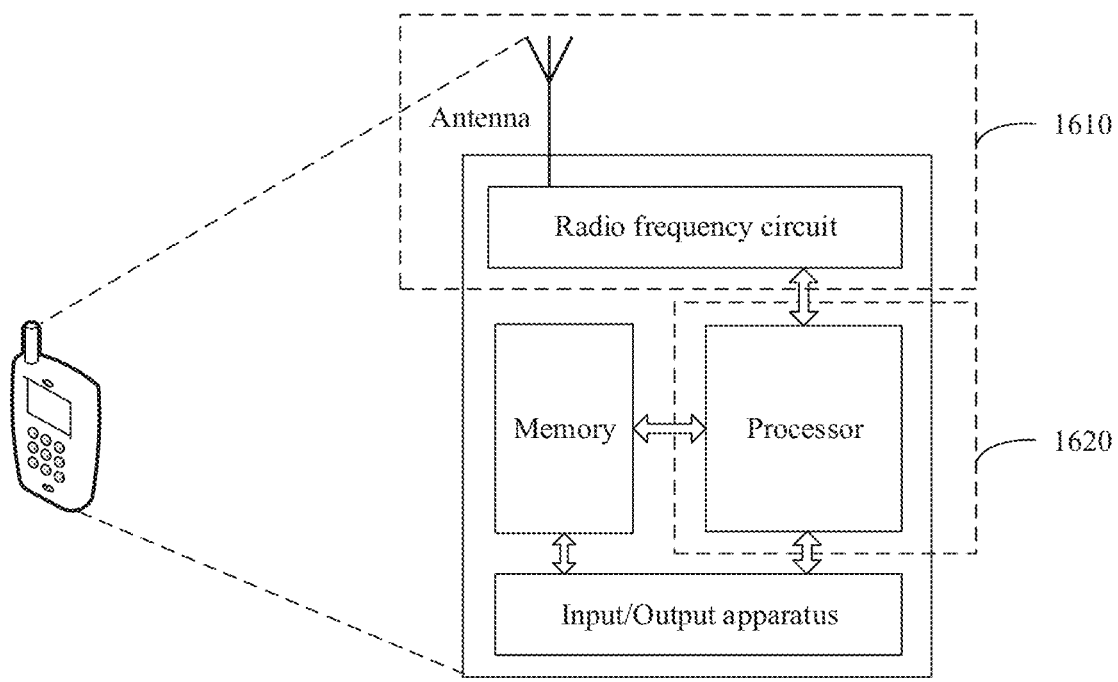
FIG. 16 is a schematic block diagram of a communications device according to an embodiment of this application.

When the communications device is a terminal, FIG. 16 is a simplified schematic structural diagram of a terminal. For ease of understanding and illustration, in FIG. 16, an example in which the terminal is a mobile phone is used. As shown in FIG. 16, the terminal includes a processor, a memory, a radio frequency circuit, an antenna, and an input/output apparatus. The processor is mainly configured to: process a communication protocol and communication data, control the terminal, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user. It should be noted that some types of terminals may not have an input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 16. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit having a transceiver function may be considered as a transceiver unit of the terminal, and the processor having a processing function may be considered as a processing unit of the terminal. As shown in FIG. 16, the terminal includes a transceiver unit 1610 and a processing unit 1620. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1610 and that is configured to implement a receiving function may be considered as a receiving unit, and a component that is in the transceiver unit 1610 and that is configured to implement a sending function may be considered as a sending unit. In other words, the transceiver unit 1610 includes the receiving unit and the sending unit. The transceiver unit may also be sometimes referred to as a transceiver, a transceiver machine, a transceiver circuit, or the like. The receiving unit may also be sometimes referred to as a receiver, a receiver machine, a receiver circuit, or the like. The sending unit may also be sometimes referred to as a transmitter, a transmitter machine, a transmitter circuit, or the like.

It should be understood that the transceiver unit 1610 is configured to perform a sending operation and a receiving operation on a terminal side in the foregoing method embodiments, and the processing unit 1620 is configured to perform an operation other than the sending operation and the receiving operation on the terminal in the foregoing method embodiments.

For example, in an implementation, the transceiver unit 1610 is configured to perform a receiving operation on the terminal side in S608 in FIG. 6A and FIG. 6B, and a sending operation on the terminal side in S610 in FIG. 6A and FIG. 6B, and/or the transceiver unit 1610 is further configured to perform another sending and receiving step on the terminal side in this embodiment of this application. The processing unit 1620 is configured to perform a step in addition to S608 and S610 in any one of the foregoing implementation procedures, and/or the processing unit 1620 is further configured to perform another processing step on the terminal side in this embodiment of this application.

For another example, in another implementation, the transceiver unit 1610 is configured to perform a receiving operation on the terminal side in S60314 and S608 in FIG. 7A and FIG. 7B, and a sending operation on the terminal side in S60316 and S610 in FIG. 7A and FIG. 7B, and/or the transceiver unit 1620 is further configured to perform another sending and receiving step on the terminal side in this embodiment of this application. The processing unit 1620 is configured to perform a measurement step on the terminal side in S60314 in FIG. 7A and FIG. 7B, and/or the processing unit 1620 is further configured to perform another processing step on the terminal side in this embodiment of this application.

For still another example, in still another implementation, the transceiver unit 1610 is configured to perform a receiving operation on the terminal side in S60324 and S608 in FIG. 8A and FIG. 8B, and a sending operation on the terminal side in S60326 and S610 in FIG. 8A and FIG. 8B, and/or the transceiver unit 1610 is further configured to perform another sending and receiving step on the terminal side in this embodiment of this application. The processing unit 1620 is configured to perform a measurement step on the terminal side in S60324 in FIG. 8A and FIG. 8B, and/or the processing unit 1620 is further configured to perform another processing step on the terminal side in this embodiment of this application.

For still another example, in still another implementation, the transceiver unit 1610 is configured to perform a receiving operation on the terminal side in S608 in FIG. 10A and FIG. 10B, or a sending operation on the terminal side in S610 in FIG. 10A and FIG. 10B, and/or the transceiver unit 1110 is further configured to perform another sending and receiving step on the terminal side in this embodiment of this application. The processing unit 1620 is further configured to perform other processing steps on the terminal side in this embodiment of this application.

When the communications device is a chip, the chip includes a transceiver unit and a processing unit. The transceiver unit may be an input/output circuit or a communications interface. The processing unit is a processor, a microprocessor, or an integrated circuit integrated on the chip.

Figure 17:
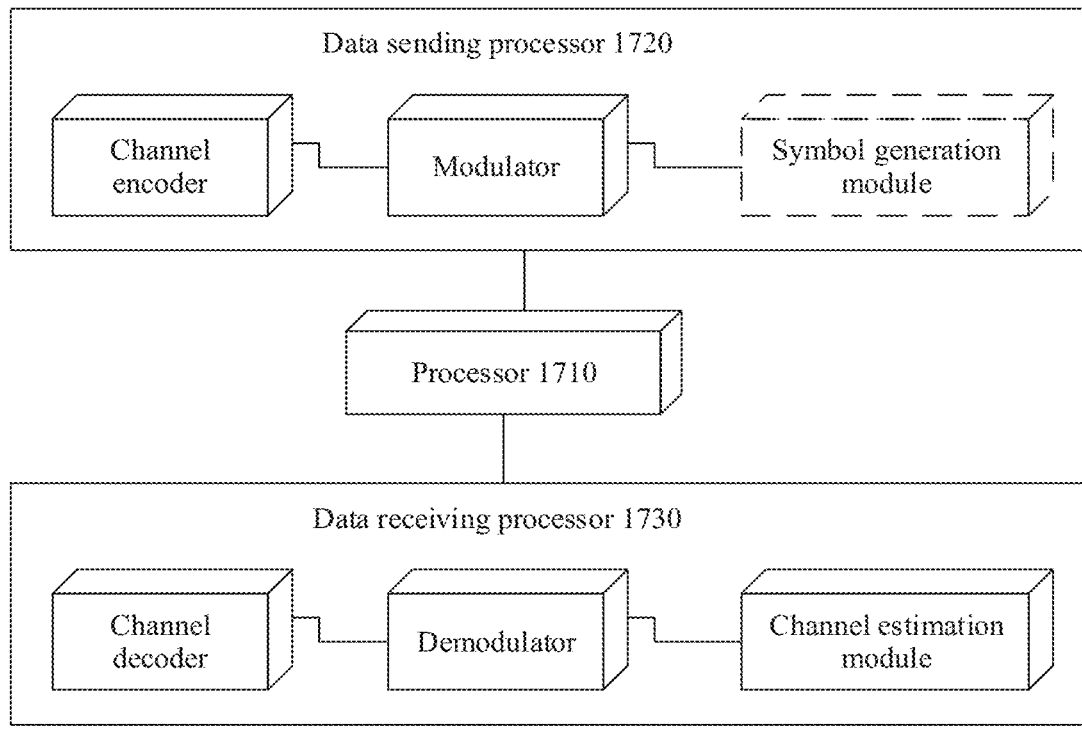
FIG. 17 is another schematic block diagram of a communications device according to an embodiment of this application.

When the communications device in this embodiment is a terminal, refer to the device shown in FIG. 17. In an example, the device can implement a function similar to a function of the processor 1110 in FIG. 11. In FIG. 17, the device includes a processor 1710, a data sending processor 1720, and a data receiving processor 1730. The processing module 1110 in the foregoing embodiment may be the processor 1710 in FIG. 17, and completes a corresponding function. The transceiver module 1130 in the foregoing embodiment may be the data sending processor 1720 and/or the data receiving processor 1730 in FIG. 17. Although FIG. 17 shows a channel encoder and a channel decoder, it may be understood that these modules do not constitute a limitation on this embodiment and are merely examples.

Figure 18:
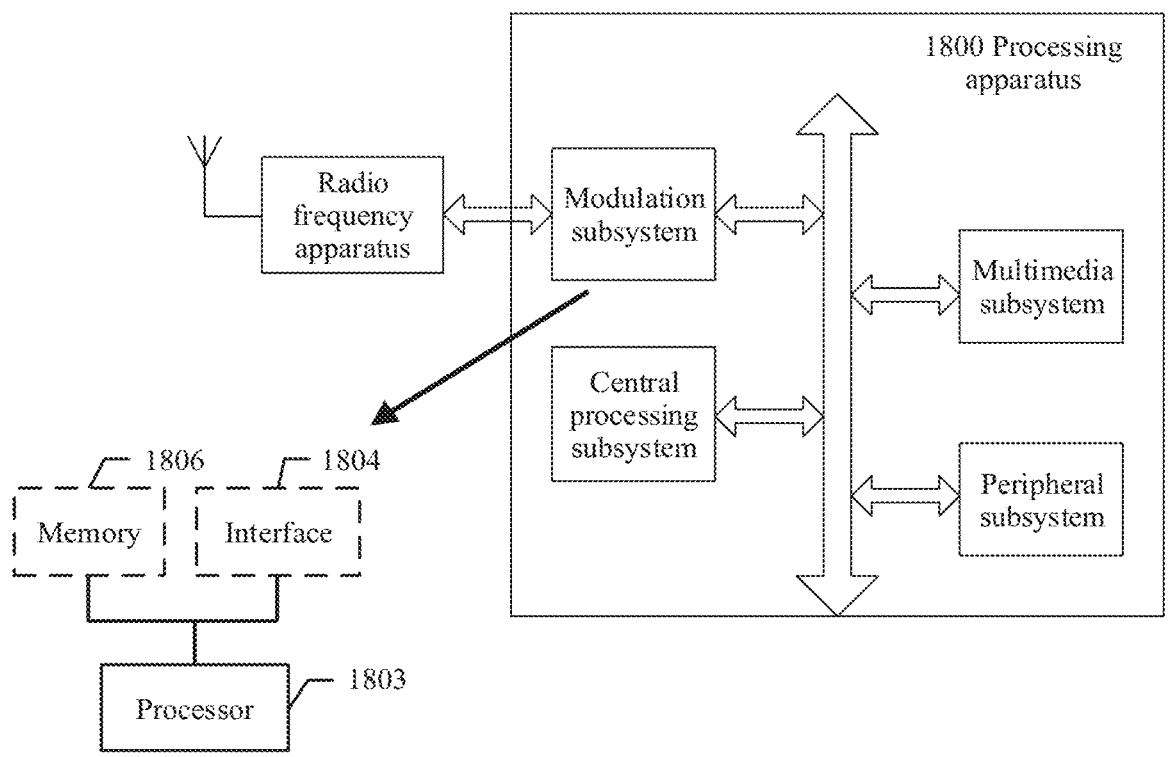
FIG. 18 is still another schematic block diagram of a communications device according to an embodiment of this application.

FIG. 18 shows another form of this embodiment. A processing apparatus 1800 includes modules such as a modulation subsystem, a central processing subsystem, and a peripheral subsystem. The communications device in this embodiment may be used as the modulation subsystem in the processing apparatus 1800. Specifically, the modulation subsystem may include a processor 1803 and an interface 1804. The processor 1803 implements a function of the processing module 1110, and the interface 1804 implements a function of the transceiver module 1130. In another variant, the modulation subsystem includes a memory 1806, a processor 1803, and a program that is stored in the memory 1806 and that can run on the processor. When executing the program, the processor 1803 implements the method on the terminal side in the foregoing method embodiments. It should be noted that the memory 1806 may be nonvolatile or volatile. The memory 1806 may be located in the modulation subsystem, or may be located in the processing apparatus 1800, provided that the memory 1806 can be connected to the processor 1803.

In another form of this embodiment, a computer-readable storage medium is provided. The computer-readable storage medium stores an instruction, and when the instruction is executed, the method on the terminal side in the foregoing method embodiments is performed.

In another form of this embodiment, a computer program product including an instruction is provided. When the instruction is executed, the method on the terminal side in the foregoing method embodiments is performed.

In addition, an embodiment of this application further provides a computer-readable storage medium. The computer-readable storage medium stores a computer program. When the computer program is run on a computer, the computer is enabled to perform the information processing method in the foregoing embodiments.

In addition, an embodiment of this application further provides a computer program product. The computer program product includes a computer program. When the computer program is run on a computer, the computer is enabled to perform the information processing method in the foregoing embodiments.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or other programmable apparatuses. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

What is claimed is:

1. An information processing method, comprising:
   receiving, positioning request information, wherein the positioning request information carries identification information of a location measurement unit;
   generating, first configuration information of an uplink reference signal, wherein the first configuration information comprises a first mapping relationship between an uplink reference signal resource and first information, wherein the first information is number information or index information about a downlink reference signal of the location measurement unit, and wherein the location measurement unit is different from network device;
   sending, the first configuration information to a terminal device; and
   sending, second configuration information to a positioning entity, wherein the second configuration information comprises a second mapping relationship between the uplink reference signal resource and the location measurement unit.

2. The method according to claim 1, wherein the downlink reference signal is measured by the terminal device.

3. The method according to claim 1, wherein the positioning request information is received from the positioning entity and is for the terminal device.

4. The method according to claim 1, wherein the first configuration information further comprises a second mapping relationship between the uplink reference signal resource and the location measurement unit.

5. The method according to claim 1, wherein the identification information of the location measurement unit comprises at least one of the following:
   a physical cell identifier (PCI);
   a cell global identifier;
   a frequency;
   an indication indicating whether a supplementary uplink (SUL) band is supported; and
   a sequence number of the downlink reference signal.

6. The method according to claim 1, wherein the uplink reference signal is a sounding reference signal (SRS), and wherein the uplink reference signal resource is an SRS resource.

7. The method according to claim 1, wherein the first mapping relationship comprises a second mapping relationship between the uplink reference signal resource and the location measurement unit.

8. An information processing method, comprising:
   receiving first configuration information from a network device, wherein the first configuration information comprises at least a first mapping relationship between an uplink reference signal resource and first information, wherein the first information is number information or index information about a downlink reference signal of a location measurement unit, and wherein the location measurement unit is different from the network device; and
   sending, based on the first mapping relationship in the first configuration information, an uplink reference signal on the uplink reference signal resource included in the first mapping relationship and in a beam direction indicated by the first information corresponding to the uplink reference signal resource.

9. The method according to claim 8, wherein the first configuration information further comprises a second mapping relationship between the uplink reference signal resource and the location measurement unit.

10. The method according to claim 8, wherein the downlink reference signal is measured by a terminal device.

11. The method according to claim 8, wherein identification information of the location measurement unit comprises at least one of the following:
    a physical cell identifier (PCI);
    a cell global identifier;
    a frequency;
    an indication indicating whether a supplementary uplink (SUL) band is supported; and
    a sequence number of the downlink reference signal.

12. The method according to claim 8, wherein the uplink reference signal is a sounding reference signal (SRS), and wherein the uplink reference signal resource is an SRS resource.

13. The method according to claim 8, wherein the first mapping relationship comprises a second mapping relationship between the uplink reference signal resource and the location measurement unit.

14. An apparatus, comprising:
    at least one processor; and one or more memories coupled to the at least one processor and storing programming instructions for execution by the at least one processor to perform operations comprising:
    receiving, positioning request information, wherein the positioning request information carries identification information of a location measurement unit;
    generating first configuration information of an uplink reference signal, wherein the first configuration information comprises a first mapping relationship between an uplink reference signal resource and first information, wherein the first information is number information or index information about a downlink reference signal of the location measurement unit, and wherein the location measurement unit is different from a network device;
    sending the first configuration information to a terminal device; and sending second configuration information to a positioning entity, wherein the second configuration information comprises a second mapping relationship between the uplink reference signal resource and the location measurement unit.

15. An apparatus, comprising:
at least one processor; and one or more memories coupled to the at least one processor and storing programming instructions for execution by the at least one processor to perform operations comprising:
receiving first configuration information from a network device, wherein the first configuration information comprises at least a first mapping relationship between an uplink reference signal resource and first information, wherein the first information is number information or index information about a downlink reference signal of a location measurement unit, and wherein the location measurement unit is different from the network device; and
sending, based on the first mapping relationship in the first configuration information, an uplink reference signal on the uplink reference signal resource included in the first mapping relationship and in a beam direction indicated by the first information corresponding to the uplink reference signal resource.

16. The apparatus according to claim 15, wherein the first configuration information further comprises a second mapping relationship between the uplink reference signal resource and the location measurement unit.

* * * * *